(12) United States Patent
Carlson et al.

(10) Patent No.: US 6,957,632 B1
(45) Date of Patent: Oct. 25, 2005

(54) AIR CHARGING SYSTEM FOR AN OPPOSED PISTON OPPOSED CYLINDER FREE PISTON ENGINE

(75) Inventors: Cliff Carlson, Fenton, MI (US); Lixin Peng, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/849,612

(22) Filed: May 20, 2004

(51) Int. Cl.[7] ............................................. F02B 71/00
(52) U.S. Cl. ................................. 123/46 R; 123/46 B
(58) Field of Search ............................. 123/46 R, 46 B

(56) References Cited

U.S. PATENT DOCUMENTS

| | | | |
|---|---|---|---|
| 3,835,824 A | * | 9/1974 | MacDonald ............... 123/46 R |
| 4,048,970 A | * | 9/1977 | Fitzgerald ................. 123/46 R |
| 4,244,331 A | * | 1/1981 | Mettier ..................... 123/46 B |
| 4,562,796 A | * | 1/1986 | Eickmann ............... 123/65 BA |
| 4,876,991 A | * | 10/1989 | Galitello, Jr. ............. 123/46 E |
| 5,213,067 A | | 5/1993 | Kramer |
| 5,287,827 A | * | 2/1994 | Almendinger et al. ..... 123/46 R |
| 5,775,273 A | * | 7/1998 | Beale ....................... 123/46 B |
| 6,170,443 B1 | | 1/2001 | Hofbauer |
| 6,279,517 B1 | | 8/2001 | Achten |
| 2002/0134324 A1 | * | 9/2002 | Wechner ................... 123/46 R |

OTHER PUBLICATIONS

Goertz et al., Free Piston Engine Its Application and Optimization, Mar. 6, 2000, pp. 1-10, SAE Technical Paper Series, 2000-01-0996.

* cited by examiner

Primary Examiner—Erick Solis
(74) Attorney, Agent, or Firm—David B. Kelley; MacMillan, Sobanski & Todd

(57) ABSTRACT

A free piston engine is configured with a pair of opposed engine cylinders located on opposite sides of a fluid pumping assembly. An inner piston assembly includes a pair of inner pistons, one each operatively located in a respective one of the engine cylinders, with a push rod connected between the inner pistons. The push rod extends through an inner pumping chamber in the fluid pumping assembly and forms a fluid plunger within this chamber. An outer piston assembly includes a pair of pistons, one each operatively located in a respective one of the engine cylinders, with at least one pull rod connected between the outer pistons. The pull rod extends through an outer pumping chamber in the fluid pumping assembly and forms a fluid plunger within this chamber. Each outer piston cooperates with an integrated scavenge pump in order to compress the charge air, thus significantly increasing the air charge density into the engine cylinders for each stroke of the engine.

20 Claims, 16 Drawing Sheets

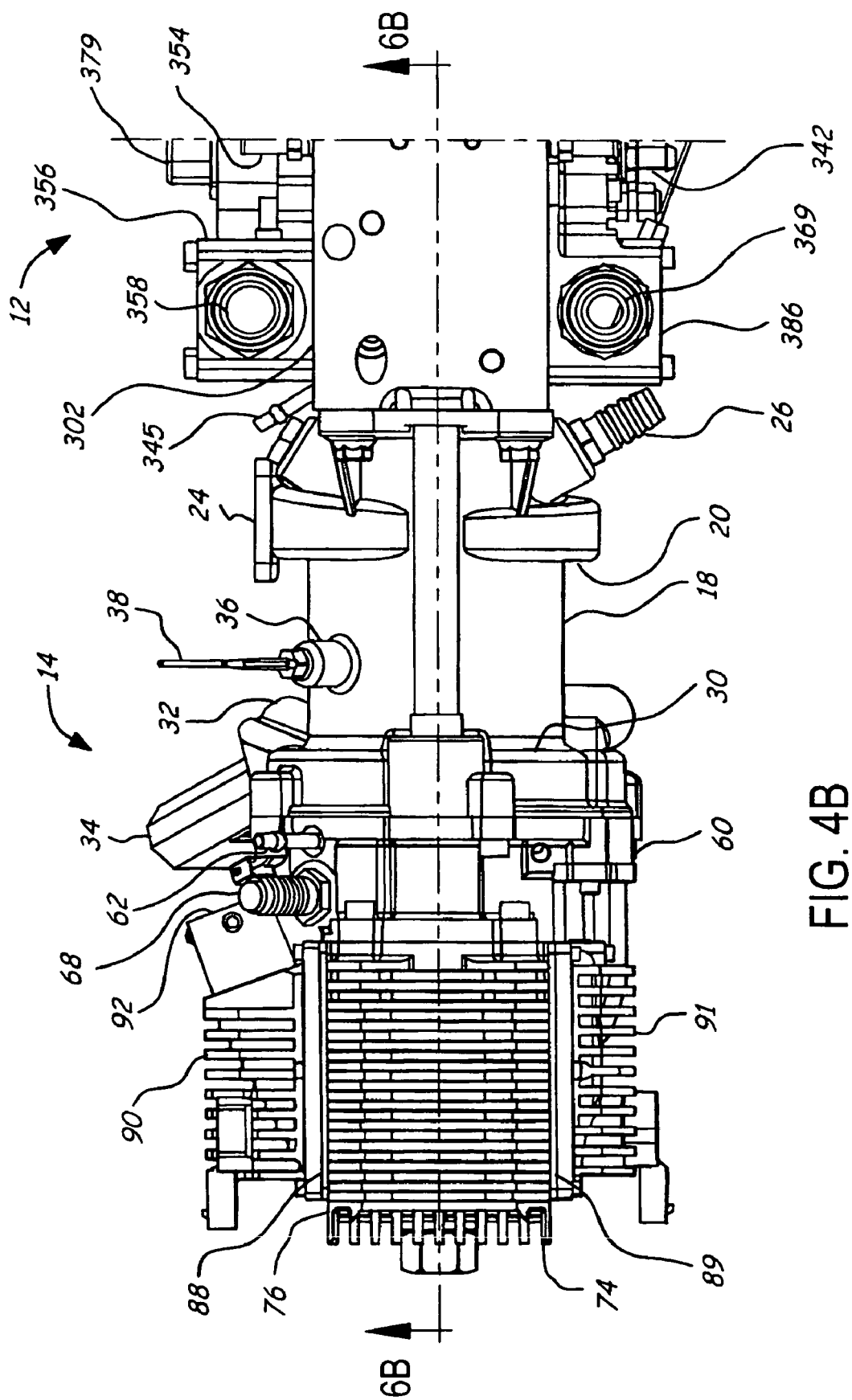

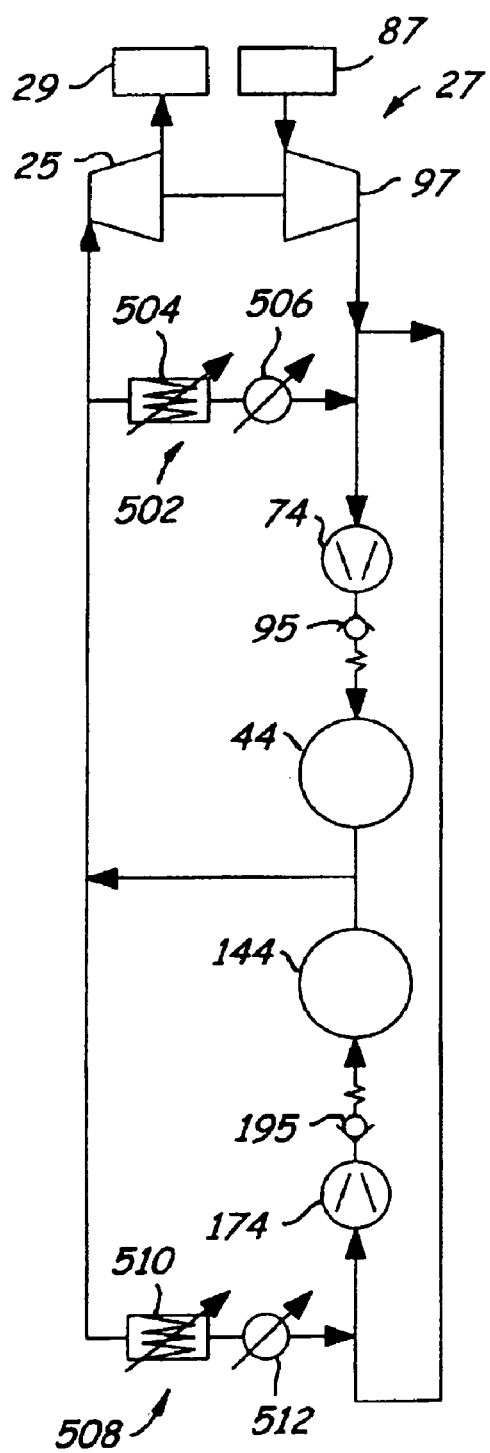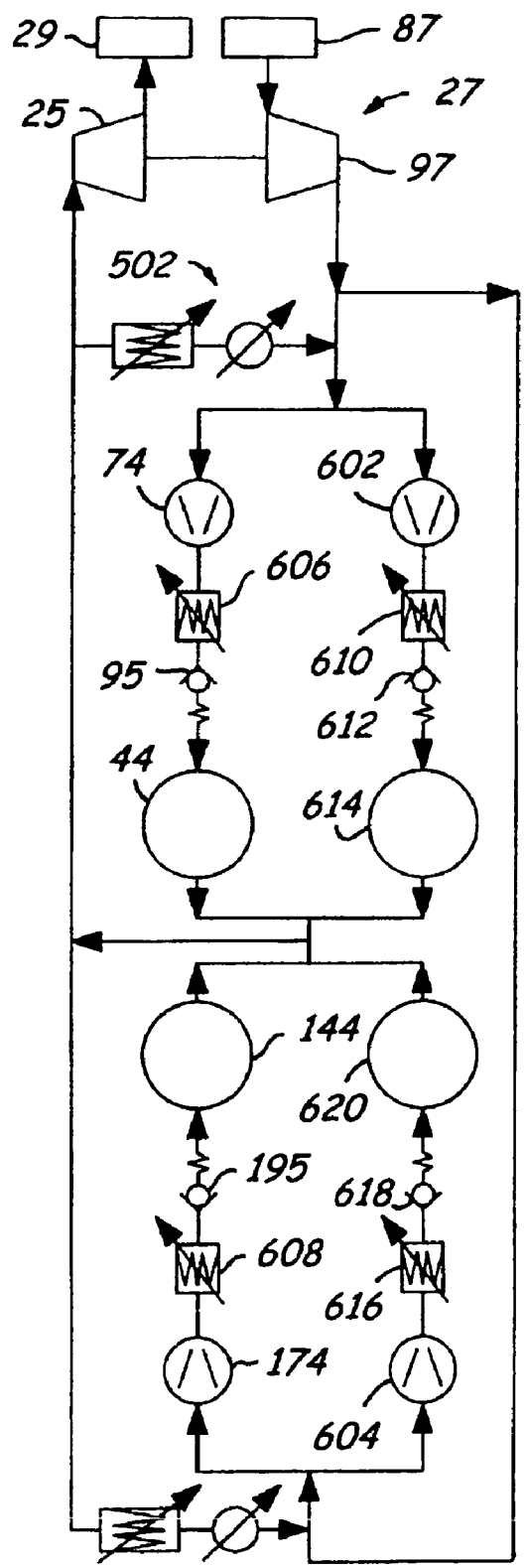
FIG. 15
FIG. 16

US 6,957,632 B1

AIR CHARGING SYSTEM FOR AN OPPOSED PISTON OPPOSED CYLINDER FREE PISTON ENGINE

BACKGROUND OF INVENTION

The present invention relates to free piston engines, and more particularly to free piston engines having an opposed piston opposed cylinder configuration.

Conventionally, internal combustion engines have operated with the motion of the pistons mechanically fixed. For example, a conventional internal combustion engine for a motor vehicle includes crankshaft and connecting rod assemblies that mechanically determine the motion of each piston within its respective cylinder. This type of engine is desirable because the position of each piston is know for any given point in the engine cycle, which simplifies timing and operation of the engine. While these conventional types of engines have seen great improvements in efficiency in recent years, due to the nature of the engines, that efficiency is still limited. In particular, the power density is limited because the mechanically fixed motion of the pistons fixes the compression ratio. Moreover, all of the moving parts that direct the movement of the pistons (and camshafts and engine valves as well) create a great deal of friction, which takes energy from the engine itself to overcome. The resulting lower power density means that the engine will be larger and heavier than is desired. Also, the flexibility in the engine design and packaging is limited because of all of the mechanical connections that must be made.

Some crankshaft type engines are configured to operate as a two-stroke, in order to improve the engine efficiency. The efficiency is improved by having a high boost pressure for the intake air, thus increasing the fresh air delivery to each cylinder. In such a conventional two stroke engine, the backside of the piston—facing into the crankcase—is sometimes employed as a scavenge pump. However, while this provides a significant increase in intake air pressure, it requires asymmetrical port timing, with complicated mechanisms and/or a loss of scavenge efficiency and trapping efficiency (i.e., loss of fresh air out of the exhaust ports).

Consequently, is desirable, for environmental and other reasons, to have an engine with a higher power density than these conventional engines. The advantages of lighter relative weight, smaller package size, and improved fuel efficiency can be a great advantage in both vehicle and stationary power production applications.

Another type of internal combustion engine is a free piston engine. This is an engine where the movement of the pistons in the cylinders is not mechanically fixed. The movement is controlled by the balance of forces acting on each piston at any given time. Since the motion is not fixed, the engines can have variable compression ratios, which allow for more flexibility in designing the engine's operating parameters. Also, since there are no conventional crankshafts and rods attached to the crankshaft, which reduces piston side force, there is generally less friction produced during engine operation.

An opposed piston, opposed cylinder (OPOC) configuration of a free piston engine is desirable due to its generally inherently balanced operation, with a compact layout as well. A particularly advantageous way to operate such an engine is with a two-stroke combustion cycle, which requires a means for providing sufficient air to the cylinder. Moreover, it may be desirable to operate in a two-cycle mode with homogeneous charge, combustion ignition (HCCI) combustion, which takes best advantage of the ability to operate with a variable compression ratio, further increasing the power density, emissions and fuel consumption of the engine. But this requires an even greater ability to maximize the air intake for each engine stroke since it operates with an even higher air/fuel ratio than conventional engines. Moreover, this needs to be accomplished with a high trapping efficiency in order to avoid fresh air and fuel being pushed out of the exhaust ports. This high volume of air intake ability, then, is desirable, while still being able to maintain high scavenge efficiency and trapping efficiency in a relatively compact and lightweight engine with high power density.

SUMMARY OF INVENTION

In its embodiments, the present invention contemplates a free piston engine. The free piston engine includes an energy storage and control assembly having a first side. It also includes a first combustion cylinder assembly located adjacent to the first side of the energy storage and control assembly and including a first cylinder liner that defines a generally cylindrical first engine cylinder, which is centered about an axis of motion, with the first engine cylinder having a cylinder diameter, and with the first cylinder liner including an exhaust port and an intake port extending therethrough. An outer piston assembly has a first outer piston located and telescopically slidable within the first engine cylinder along the axis of motion and has a first outer piston head facing the energy storage and control assembly, with the first outer piston including a first piston bridge located on an opposed end of the first outer piston from the first outer piston head, with the first piston bridge having an oval outer surface with a maximum diameter that is larger than the cylinder diameter of the first engine cylinder, and with the outer piston assembly including a first outer rod mounted to the first piston bridge and operatively engaging the energy storage and control assembly. A first scavenge pump is engaged with the first combustion cylinder and has a first scavenge pump housing, which defines an air inlet, an air outlet and includes a wall that defines a main pumping chamber selectively connectable to the air inlet and the air outlet, with the main pumping chamber telescopically receiving the first piston bridge therein and the wall being cylindrical in shape and having an oval cross section such that the oval outer surface of the first piston bridge seals against the wall. The free piston engine also includes a turbocharger having a turbine in fluid communication with an inlet adapted for receiving exhaust gases from the exhaust port of the first combustion cylinder, and a compressor that is rotationally driven by the turbine and in fluid communication with an outlet that is in fluid communication with the air inlet of the first scavenge pump.

An embodiment of the present invention also contemplates a free piston engine assembly having a first free piston engine including an energy generation and control assembly having a first side and a second side in opposed relation to the first side; a first combustion cylinder assembly located adjacent to the first side of the energy generation and control assembly and including a first cylinder liner that defines a first engine cylinder, and with the first cylinder liner including an exhaust port and an intake port; a second combustion cylinder assembly located adjacent to the second side of the energy generation and control assembly and including a second cylinder liner that defines a second engine cylinder, and with the second cylinder liner including an exhaust port and an intake port; and a first piston assembly having a first piston located and telescopically slidable within the first engine cylinder, a second piston located and telescopically slidable within the second engine cylinder, and a driven rod affixed between the first and second pistons and having a middle portion extending through and engaging the energy generation and control assembly. The free piston engine assembly also includes a second free piston engine including a second energy generation and control assembly having a first side and a second side in opposed relation to the first side; a third combustion cylinder assembly located adjacent to the first side of the second energy generation and control assembly and including a third cylinder liner that defines a third engine cylinder, and with the third cylinder liner including an exhaust port and an intake port, a second combustion cylinder assembly located adjacent to the second side of the second energy generation and control assembly and including a fourth cylinder liner including an exhaust port and an intake port, and a second piston assembly having a third piston located and telescopically slidable within the third engine cylinder, and a fourth piston located and telescopically slidable within the fourth engine cylinder, and a second driven rod affixed between the third and fourth pistons and having a middle portion extending through and engaging the second energy generation and control assembly. And, the free piston engine assembly includes a turbocharger having a turbine including an inlet adapted to be in fluid communication with exhaust from the exhaust ports of the first, second, third and fourth combustion cylinders, and having a compressor that is rotationally driven by the turbine and includes an outlet that is in adapted to be in fluid communication with the intake ports of the first, second, third and fourth combustion cylinders.

An advantage of an embodiment of the present invention is that an opposed piston, opposed cylinder (OPOC) configuration of a free piston engine allows for a more inherently balanced engine than other possible configurations of free piston engines. Moreover, the OPOC configured free piston engine, with relatively few major moving parts, will generally have less overall friction to overcome during engine operation than a crank engine.

An additional advantage of an embodiment of the present invention is that a variable compression ratio is not only more conducive for effective homogeneous charge, combustion ignition (HCCI) engine operation, but also allows the engine control strategy to be adaptable for a wide range of different fuels used for combustion. The OPOC free piston engine can achieve the compression energy needed for HCCI combustion, while more easily avoiding the generation of negative cycle work from early ignition than with a crankshaft engine. The air charging system significantly increases the air intake to the cylinders for each engine stroke, thus making HCCI operation more feasible.

A further advantage of an embodiment of the present invention is that the energy output from the engine can be stored as pressurized fluid or electrical power instead, if so desired.

Another advantage of an embodiment of the present invention is that efficient air charging is accomplished in order to create a desired high air intake pressure, even when employing an HCCI combustion process, which produces a lower exhaust temperature than conventional combustion process. Thus, the fresh air charge in the cylinder for each stroke is sufficiently increased, even when a high percentage exhaust gas recirculation (EGR) is employed to enhance the HCCI combustion process.

An additional advantage of an embodiment of the present invention is that it maintains a high trapping efficiency, with minimal loss of fresh air into the exhaust ports, as well as maintaining the desired amount of internal EGR.

Still another advantage of an embodiment of the present invention is that substantially symmetric intake exhaust ports may be used in order to achieve a high scavenge efficiency, without the need for asymmetrical port timing and the associated complicated mechanisms.

BRIEF DESCRIPTION OF DRAWINGS

FIGS. 4A and 4B are a side view of the engine of FIG. 1.

FIG. 15 is a schematic view of an air charging system according to a fourth embodiment of the present invention.

FIG. 16 is a schematic view of an air charging system according to a fifth embodiment of the present invention.

DETAILED DESCRIPTION

Figure 1:
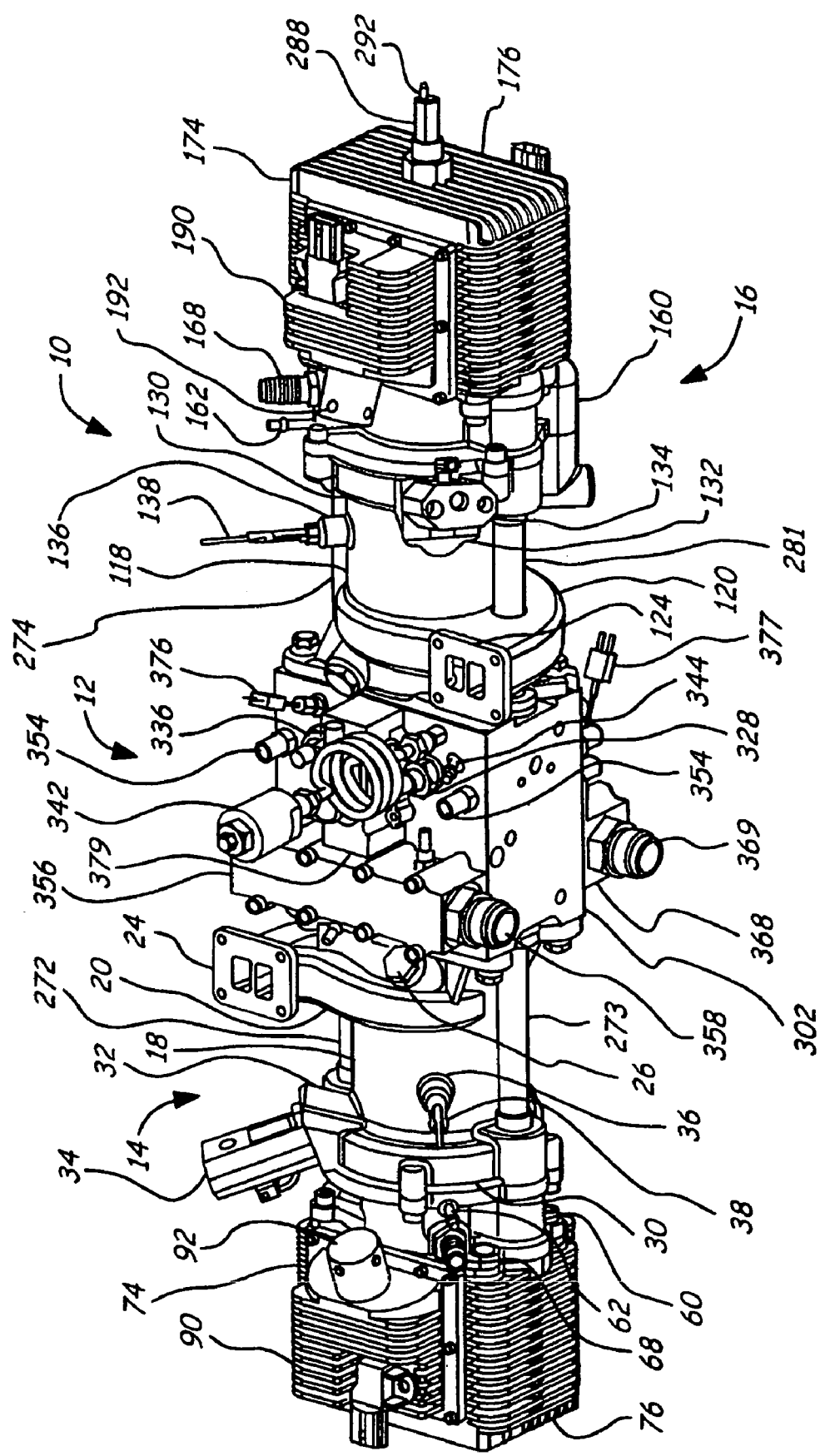
FIG. 1 is a perspective view of an opposed piston, opposed cylinder, free piston engine with hydraulic control and output, in accordance with the present invention.
Figure 2:
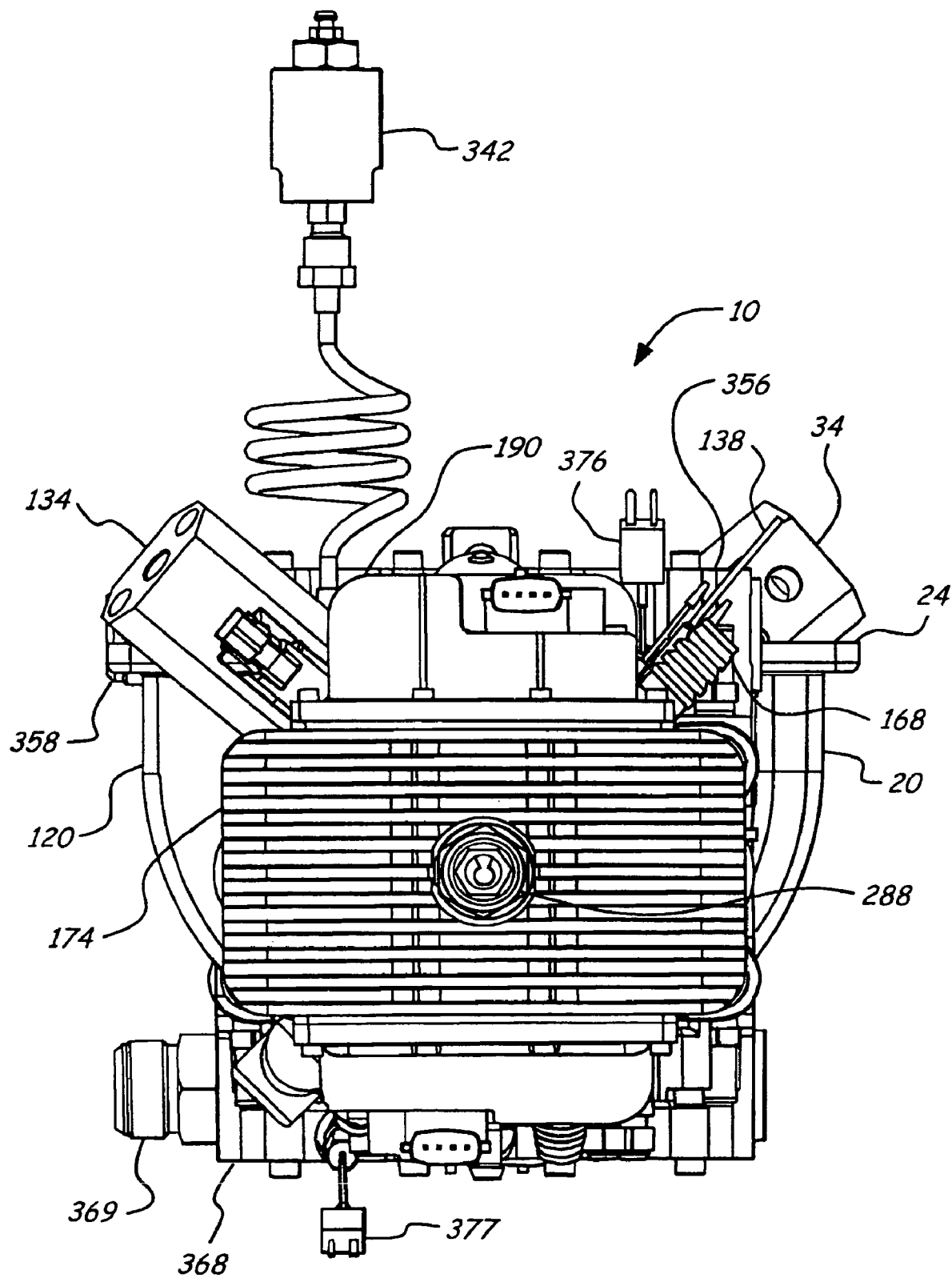
FIG. 2 is an end view of the engine of FIG. 1.
Figure 3A:
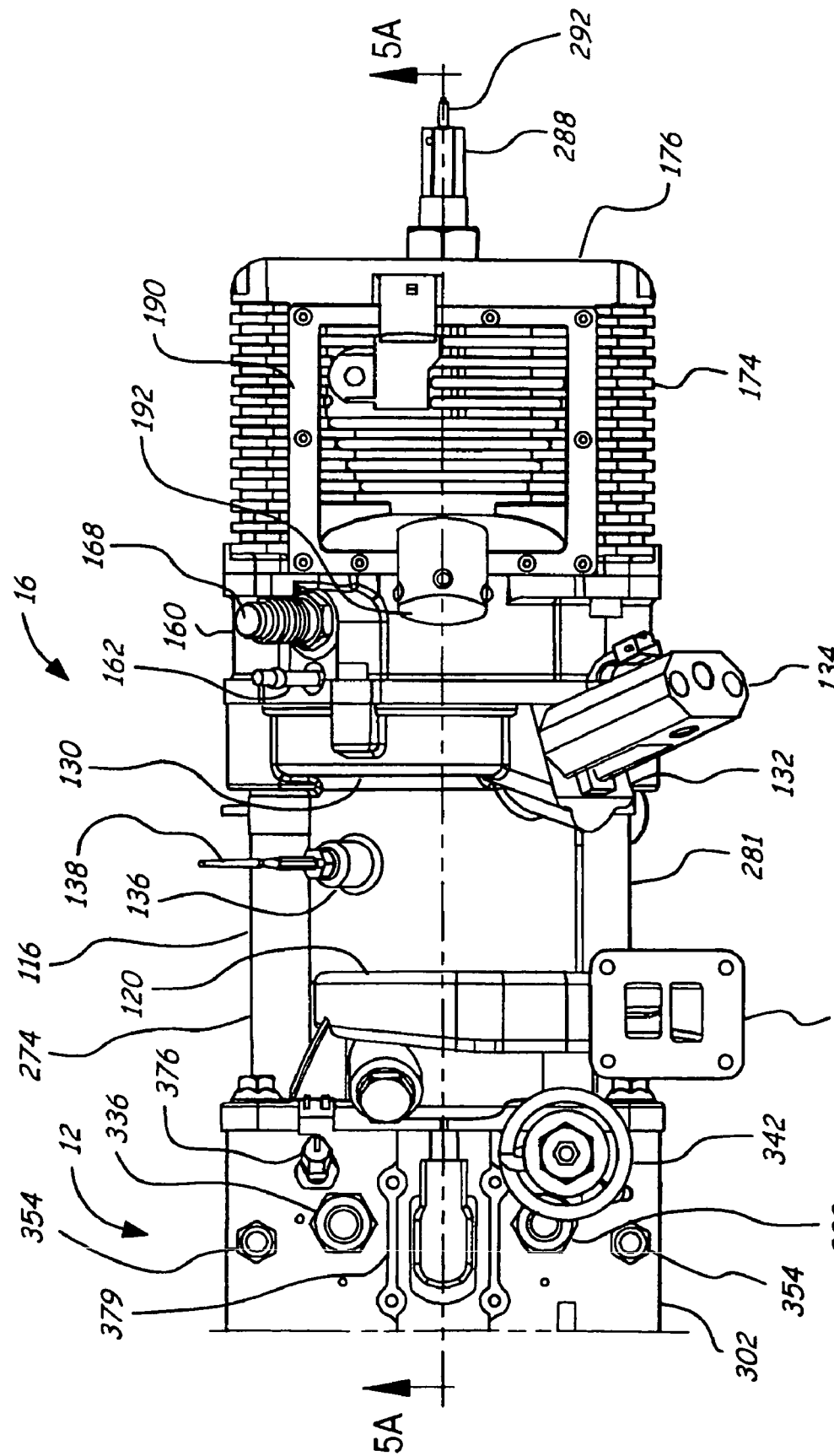
FIGS. 3A and 3B are a top, plan view of the engine of FIG. 1.
Figure 3B:
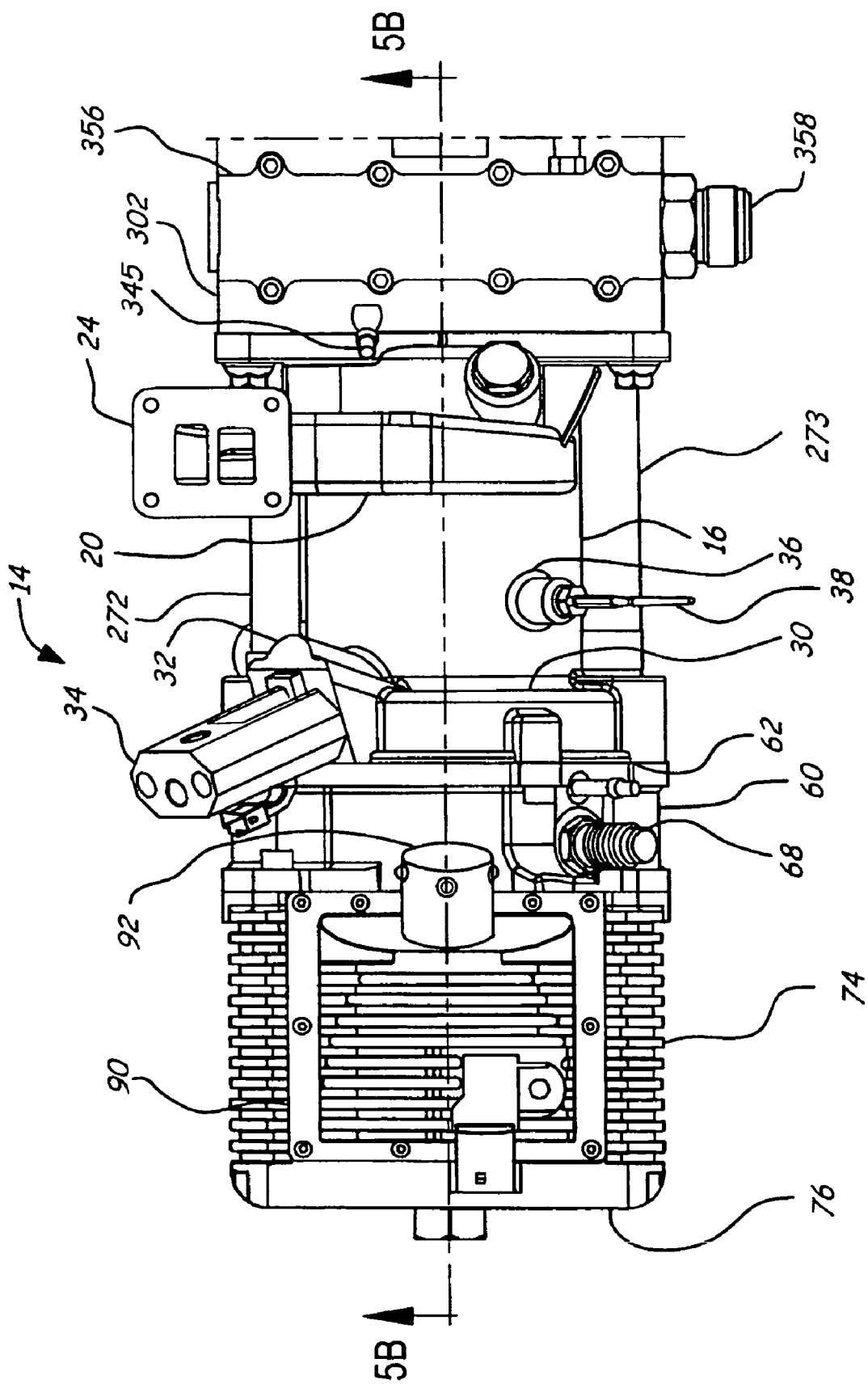
Figure 4A:
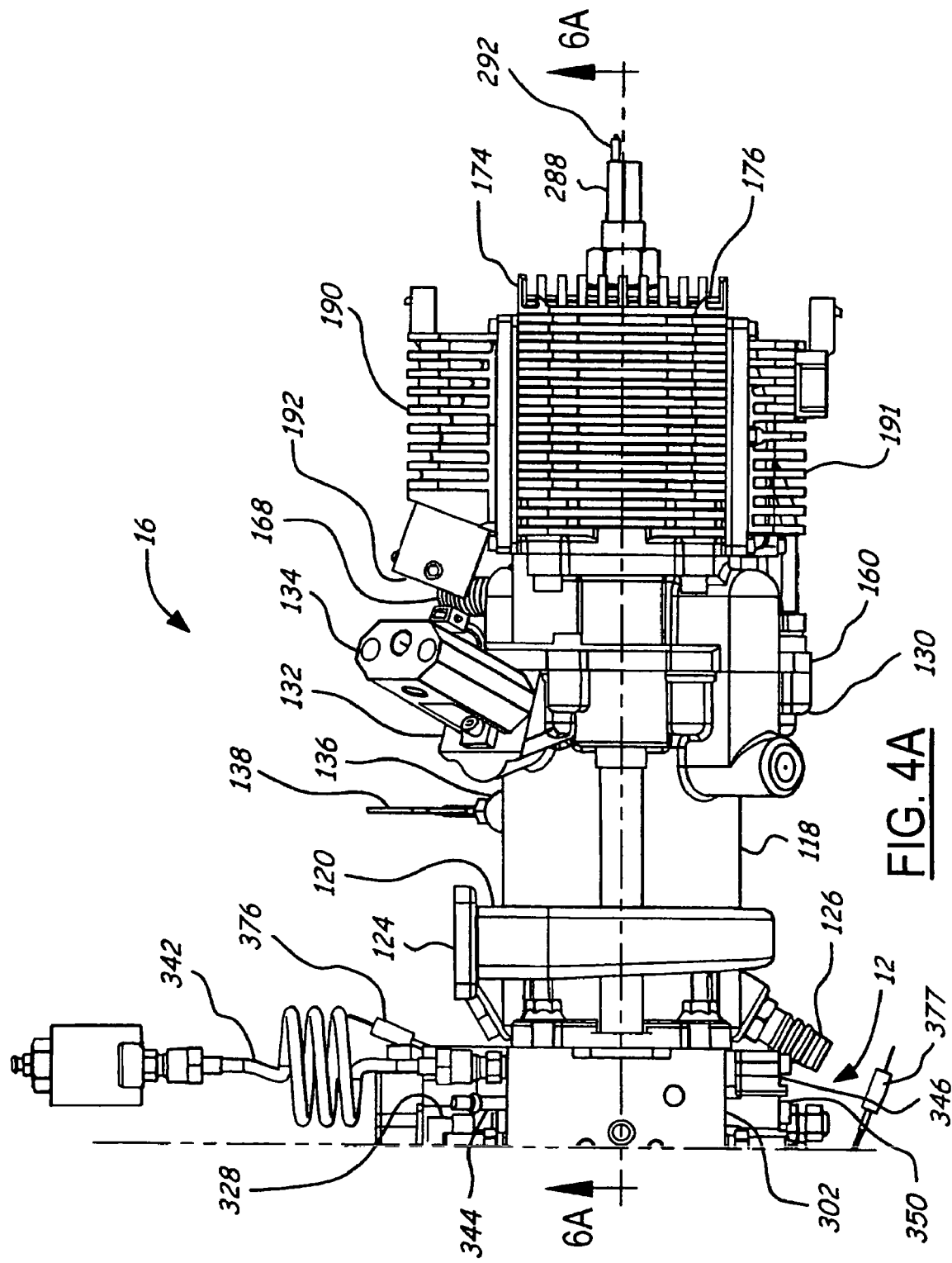
Figure 5A:
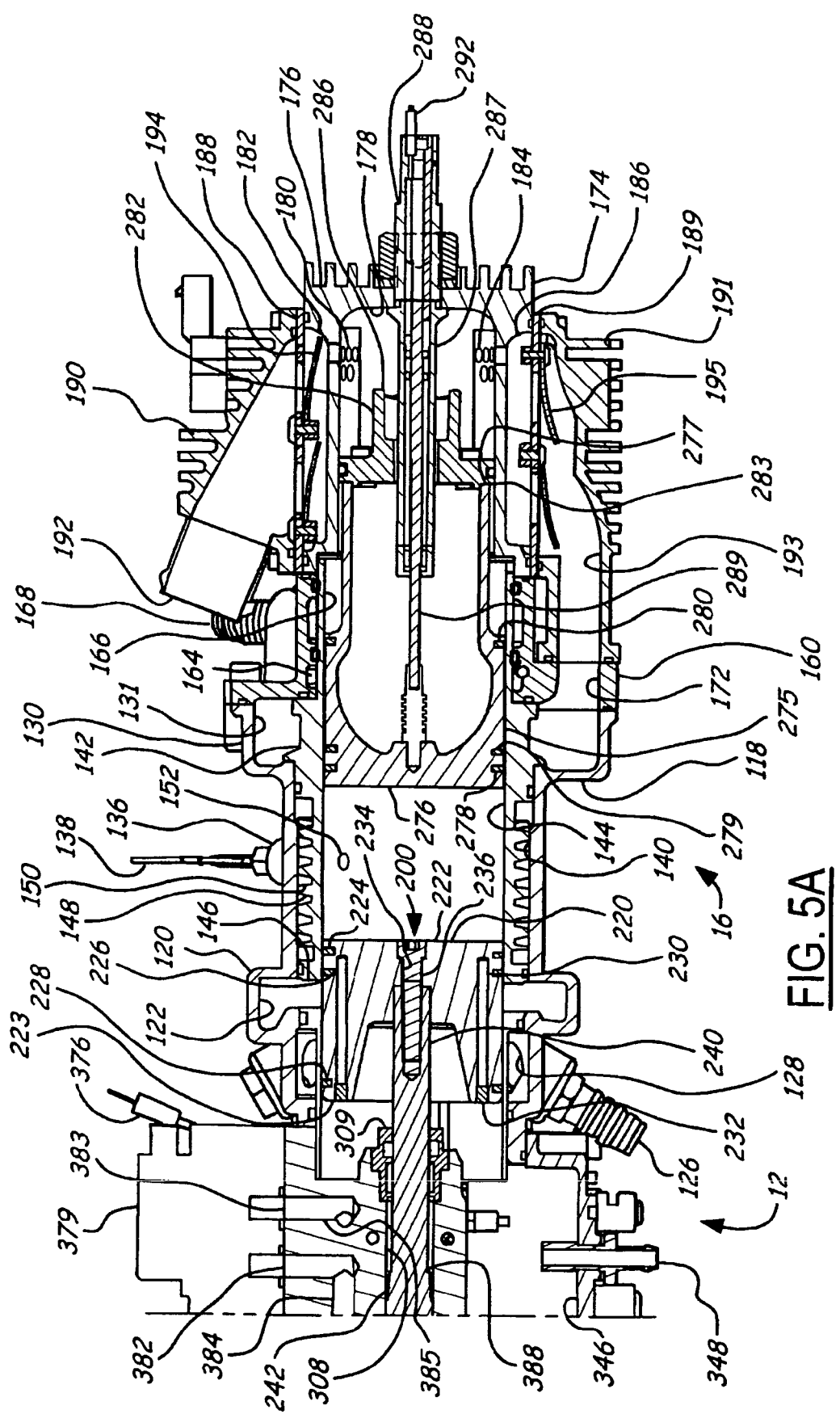
FIG. 5A is a sectional view of the engine taken along line 5A—5A in FIG. 3A.
Figure 5B:
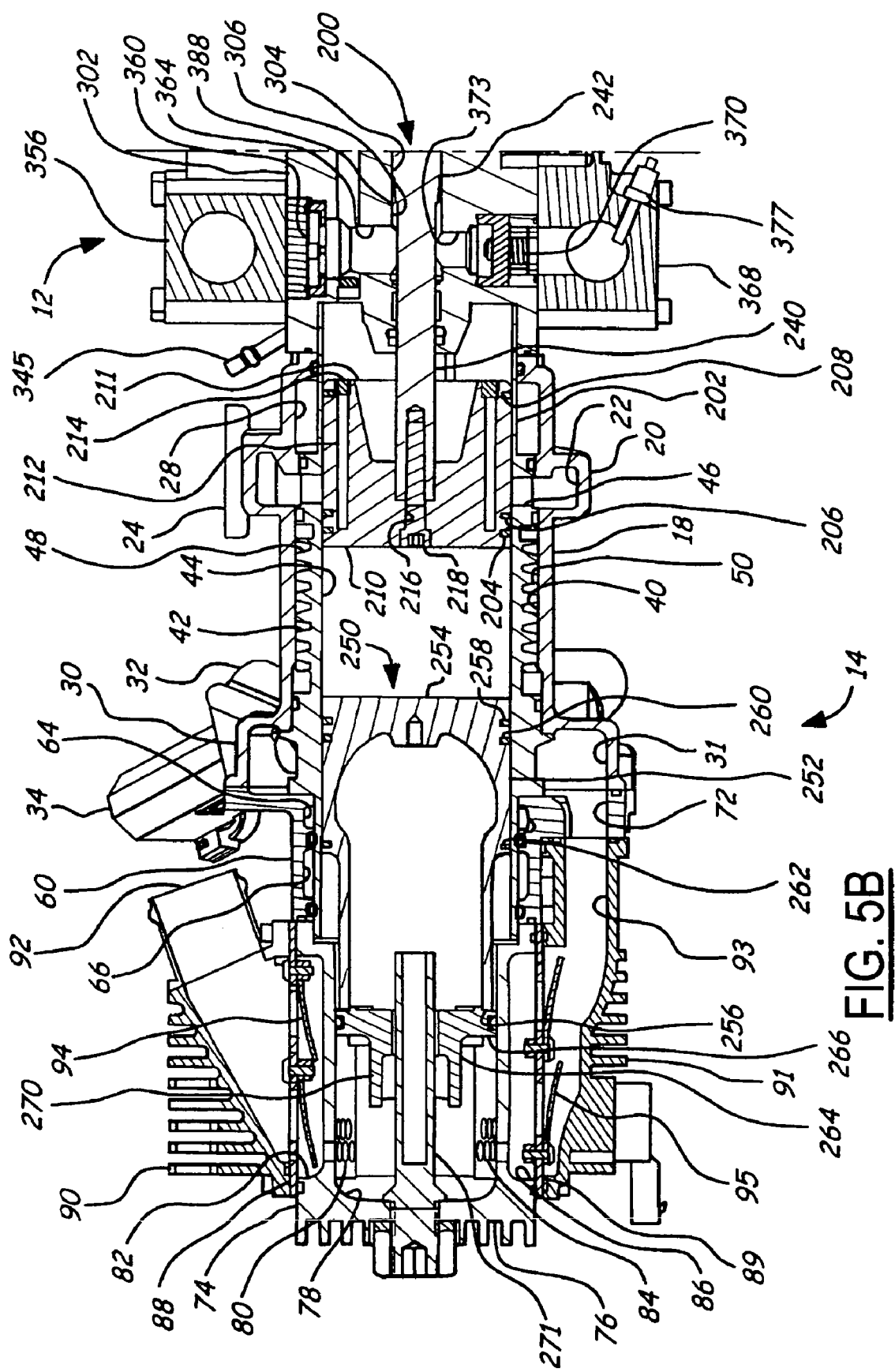
FIG. 5B is a sectional view of the engine taken along line 5B—5B in FIG. 3B.
Figure 6A:
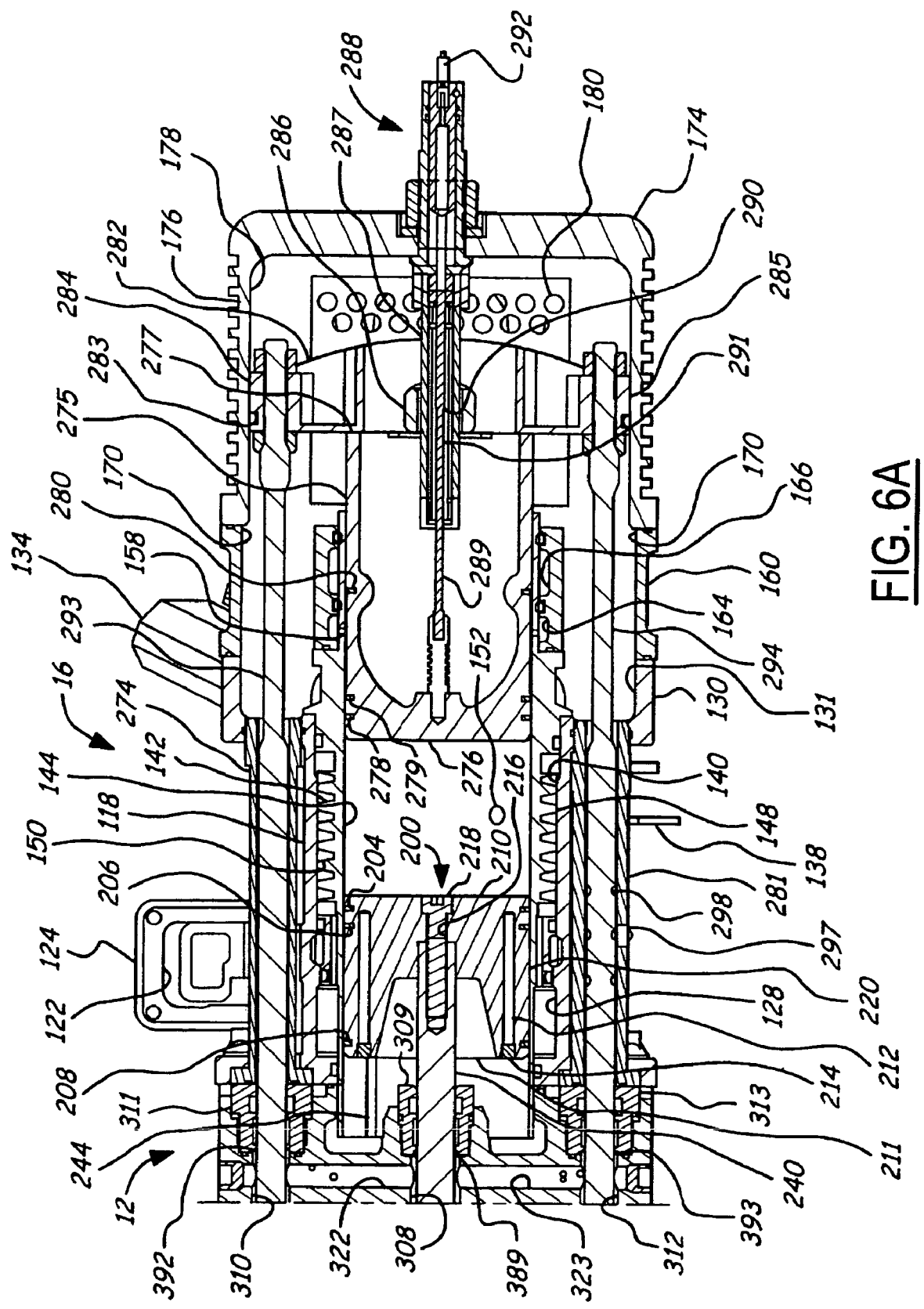
FIG. 6A is a sectional view of the engine taken along line 6A—6A in FIG. 4A.
Figure 6B:
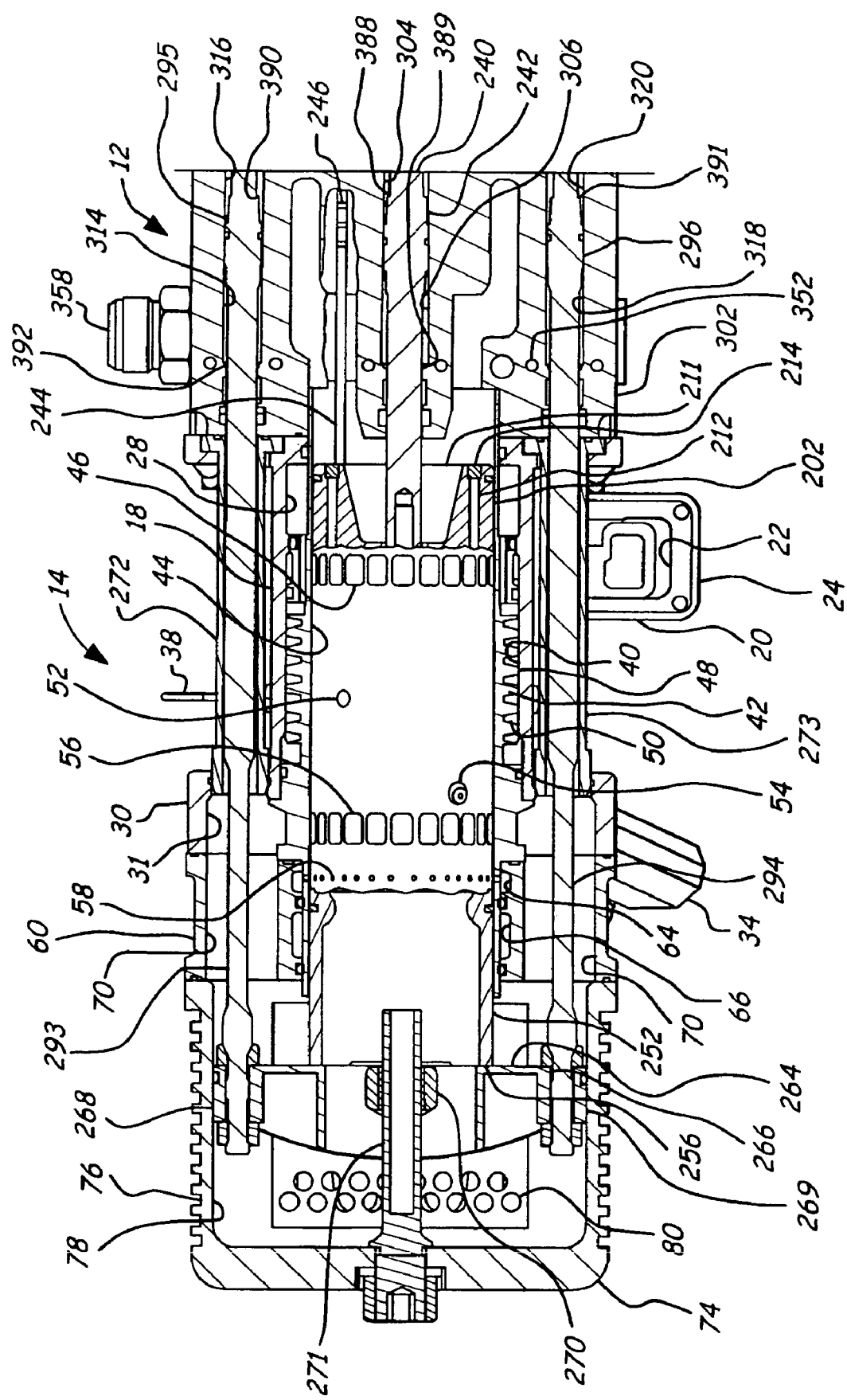
FIG. 6B is a section view of the engine taken along line 6B—6B in FIG. 4B.
Figure 7:
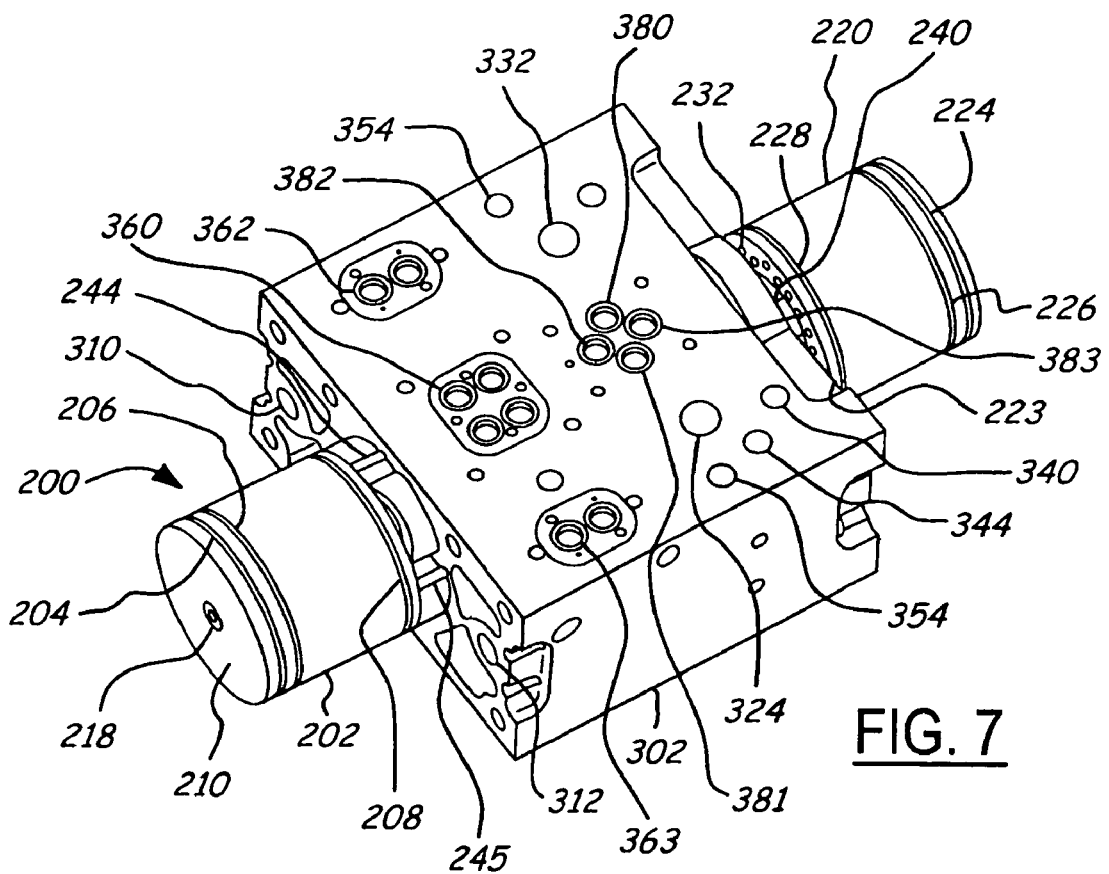
FIG. 7 is a perspective view of a portion of the engine of FIG. 1; and, more specifically, a perspective view of the top of a hydraulic pump block assembly and inner piston assembly.
Figure 8:
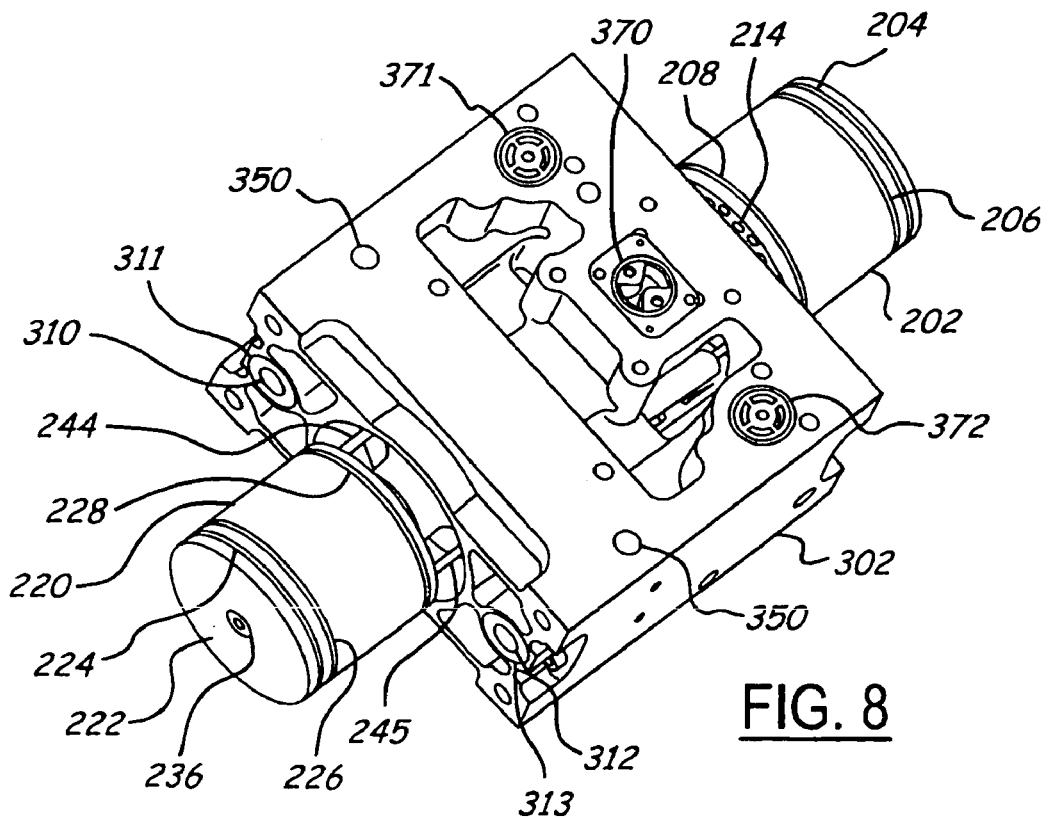
FIG. 8 is a perspective view similar to FIG. 7, but viewing the bottom of the hydraulic pump block assembly and inner piston assembly.
Figure 9:
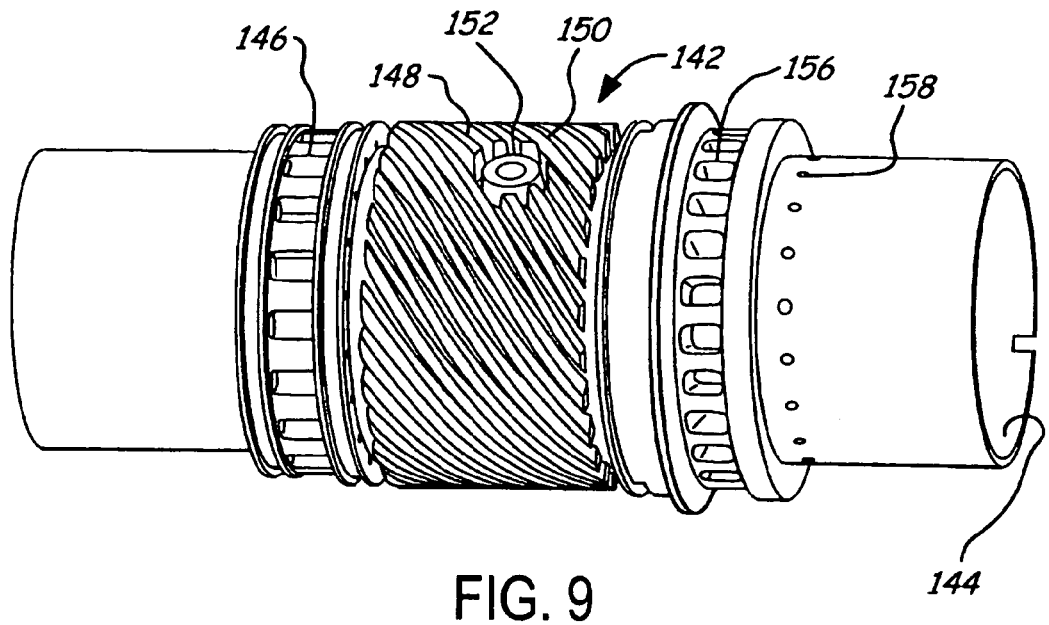
FIG. 9 is a perspective view of a cylinder liner of the engine of FIG. 1.
Figure 11:
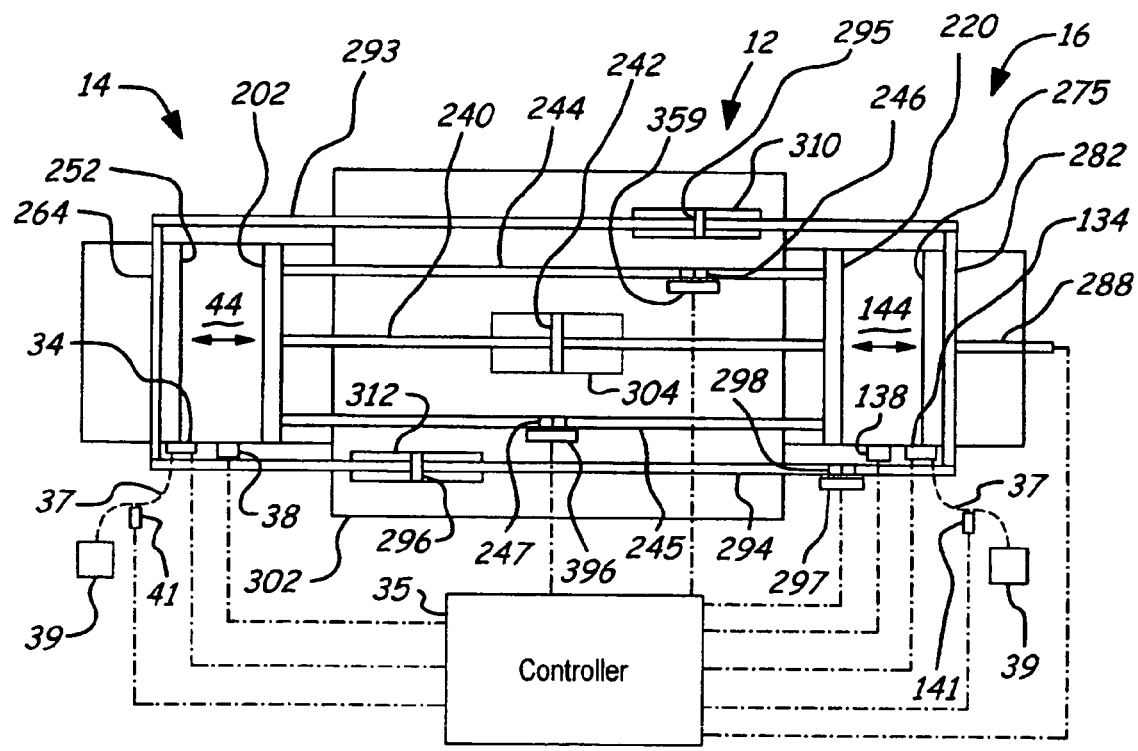
FIG. 11 is a schematic view of some of the electronic circuit employed with the engine of FIG. 1.
Figure 10:
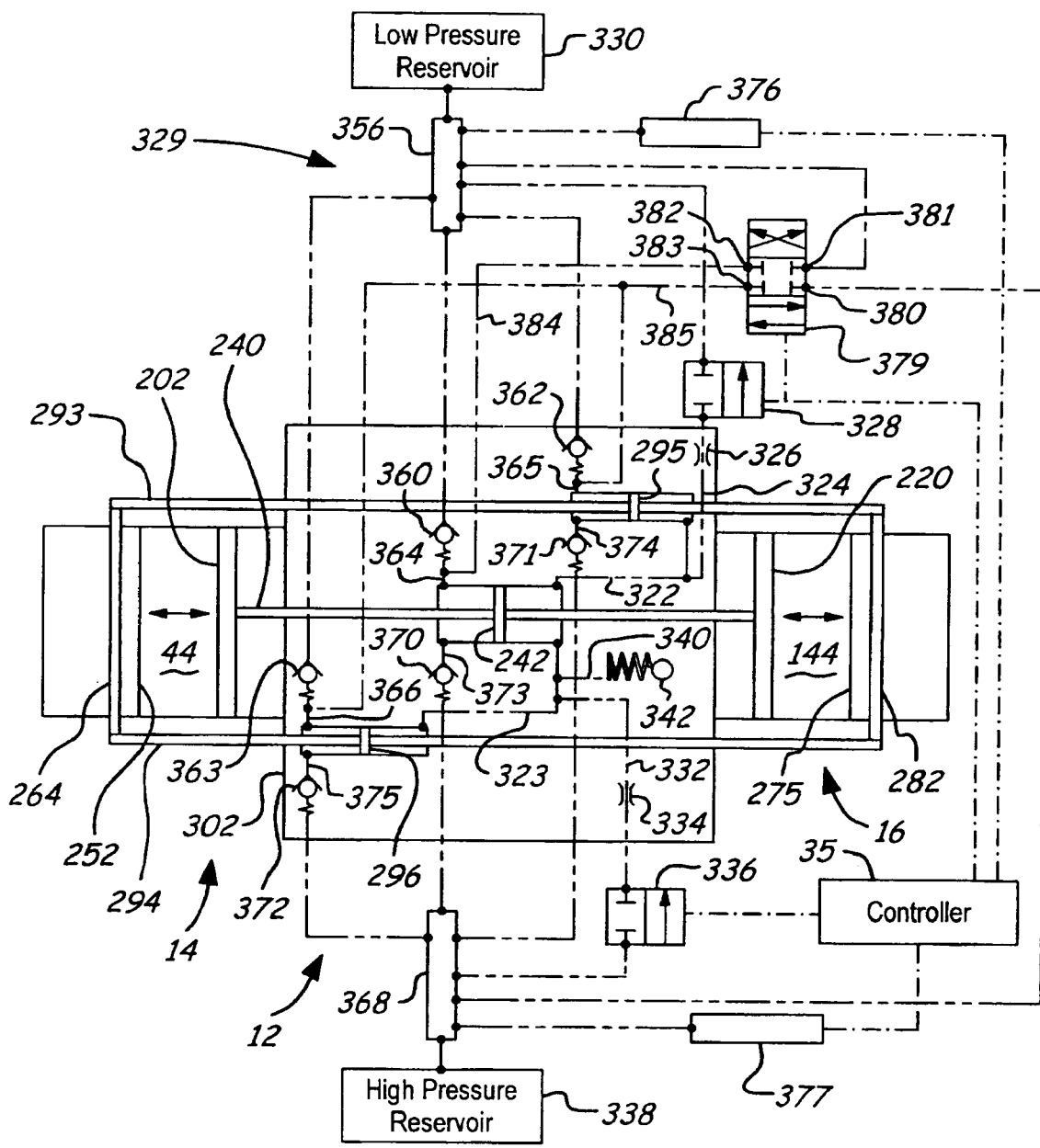
FIG. 10 is a schematic view of the hydraulic circuit of the engine of FIG. 1.

FIGS. 1–11 and 14 illustrate an opposed piston, opposed cylinder, hydraulic, free piston engine 10. The engine 10 includes a hydraulic pump block assembly 12, with a first piston/cylinder assembly 14 extending therefrom, and a second piston/cylinder assembly 16 extending from the hydraulic pump block assembly 12 in the opposite direction so they are in line. The timing of the first piston/cylinder assembly 14 is opposite to the timing of the second piston/cylinder assembly 16. Thus, when one is at top dead center, the other is at bottom dead center. Moreover, the motion is along or parallel to a single axis of motion. This configuration of free piston engine allows for a more inherently balanced engine.

The first piston/cylinder assembly 14 includes a first cylinder jacket 18, which mounts to the hydraulic pump block assembly 12. The first cylinder jacket 18 includes a first exhaust gas scroll 20, which is located adjacent to the hydraulic pump block assembly 12. The interior of the first exhaust gas scroll 20 defines an inner exhaust channel 22 that extends circumferentially around the first cylinder jacket 18 and radially outward to a first exhaust flange 24. The exhaust flange 24 is connected to a wastegate 21, which is connected to and can selectively route exhaust gas through a bypass tube 23 or a turbine 25 of a turbocharger 27. The turbocharger exhaust outlet then connects to an exhaust system 29 (only shown schematically) for carrying away the exhaust during engine operation. The exhaust system 29 can be any type desired so long as it adequately treats and carries away the exhaust gasses. It may, for example, include a muffler, a catalytic converter, or a combination of these and possibly other components. Also, while a wastegate 21 and bypass tube 23 are employed, they may be eliminated if no bypass of the turbine 25 is deemed necessary.

The first cylinder jacket 18 also has a coolant inlet 26, which is located adjacent to the hydraulic pump block assembly 12, and extends into a generally circumferentially extending coolant passage 28. The coolant inlet 26 connects to a coolant cooling system (not shown), which can include, for example, a heat exchanger, such as a radiator, for removing heat from the engine coolant, a water pump for pumping the coolant through the cooling system, a temperature sensor and flow control valve for maintaining the coolant in a desired temperature range, coolant lines extending between the components, or a combination of these and possibly other components. The cooling system can be any type of engine cooling system desired so long as it removes the appropriate amount of heat from the engine.

At the opposite end of the first cylinder jacket 18 from the exhaust gas scroll 20 is a circumferentially extending air intake annulus 30, the interior of which defines an intake channel 31. Adjacent to the air intake annulus 30, the first cylinder jacket 18 forms a fuel injector boss 32, within which a first fuel injector 34 is mounted. The first fuel injector 34 is electrically connected to an electronic controller 35, which provides a signal for determining the timing and duration of fuel injector opening. The first fuel injector 34 also connects to a fuel injector rail 37, which supplies fuel from a fuel system 39 (only shown schematically). The fuel system 39 may include, for example, a fuel tank, fuel pump, fuel lines leading to the fuel rail, or a combination of these and possibly other components. Any type of fuel system that can provide an adequate amount of fuel under the desired pressure to the fuel injector 34 is generally acceptable. Preferably, the fuel injector rail 37 also includes a fuel pressure sensor 41 that is electrically connected to the controller 35. The controller 35 is preferably powered by an electrical system with a battery (not shown), an electric generator or alternator, which is preferably powered by energy output from the engine 10, or some other adequate supply of electrical power. Also, while the controller 35 is referred to in the singular herein, it may include multiple electronic processors in communication with one another, if so desired.

About mid-way between the first exhaust gas scroll 20 and the intake annulus 30, the first cylinder jacket 18 forms a pressure sensor mounting boss 36, within which is mounted a first cylinder pressure sensor 38. The first cylinder pressure sensor 38 is preferably electrically connected to the controller 35. Both the fuel injector boss 32 and the sensor mounting boss 36 extend through the first cylinder jacket 18 to a main bore 40 that extends the length of the first cylinder jacket 18. The coolant passage 28, inner exhaust channel 22 and the air intake annulus 30 are all open into the main bore 40 as well.

The first piston/cylinder assembly 14 also includes a first cylinder liner 42, which extends through and is preferably press fit into the main bore 40 of the first cylinder jacket 18. The first cylinder liner 42 includes a cylindrical shaped main bore extending therethrough that defines the first engine cylinder 44. The central axis of the first engine cylinder is preferably along the axis of motion. The first cylinder liner 42 also includes a series of circumferentially spaced exhaust ports 46, which extend between and connect the first engine cylinder 44 and the inner exhaust channel 22 of the first cylinder jacket 18.

Adjacent to the exhaust ports 46, the first cylinder liner 42 abuts the coolant passage 28 in the first cylinder jacket 18. This coolant passage 28 connects to a series of spaced, helical ribs 48 that extend radially outward from the first cylinder liner 42 and abut the main bore 40 of the first cylinder jacket 18, forming a series of cylinder coolant passages 50. Within these ribs 48, a cylinder pressure tap boss 52 extends from the first engine cylinder 44 to the sensor mounting boss 36 on the first cylinder jacket 18. This allows the first cylinder pressure sensor 38 to be exposed to the first engine cylinder 44, while sealing the sensor 38 from the engine coolant.

A fuel injector bore 54 aligns with the fuel injector boss 32 and extends through the ribs 48 to the first engine cylinder 44. This allows the first fuel injector 34 to inject fuel directly into the first engine cylinder 44.

The first cylinder liner 42 also has a series of circumferentially spaced air intake ports 56, aligned with the air intake annulus 30 of the first cylinder jacket 18, and opening into the first cylinder 44. Preferably, the side of the air intake ports 56 closest to the center of the engine cylinder 44 are about the same distance away from the center of the cylinder as the side of the exhaust ports 46 closest to the center of the cylinder. This will provide for essentially symmetrical port timing.

Adjacent to the air intake ports 56, is a series of spaced oil mist holes 58 located circumferentially around the first cylinder liner 42.

The first piston/cylinder assembly 14 also includes a first air belt 60. The air belt 60 is mounted about the first cylinder liner 42, abutting the first cylinder jacket 18 at the location of the air intake annulus 30. An oil inlet tube 62 projects from and extends through the first air belt 60, connecting to an oil mist annulus 64. The oil mist annulus 64 abuts and extends circumferentially around the first cylinder liner 42 at the location of the oil mist holes 58. An oil supply system (not shown) connects to the oil inlet tube 62 in order to provide the oil to the oil mist annulus 64. The oil supply system may include, for example, a sump, an oil pump, an oil filter, an oil cooler, oil lines to transfer the oil through the system, or a combination of these and possibly other components. The oil supply system can be any such system that can cooperate with the engine components to adequately supply lubrication oil to the engine while it is operating.

Also abutting and extending circumferentially around the first cylinder liner 42 is a coolant annulus 66. The coolant annulus 66 connects to the cylinder coolant passages 50 and also to a coolant outlet 68 extending from the first air belt 60. This coolant outlet 68 connects to the coolant cooling system (not shown), which was discussed above. The first air belt 60 also has a pair of pull rod passages 70 and an intake air passage 72 that are in communication with the air intake annulus 30 of the first cylinder jacket 18.

The first piston/cylinder assembly 14 also incorporates a first scavenge pump 74. The scavenge pump 74 includes a scavenge pump housing 76 that mounts to the first air belt 60, and around the end of the first cylinder liner 42. The scavenge pump housing 76 has a main pumping chamber 78, with inlet ports 80 leading to an inlet chamber 82 and outlet ports 84 leading to an outlet chamber 86. The main pumping chamber 78 is cylindrical in shape, with a preferably generally elliptical cross section. The scavenge pump housing 76 may also include cooling fins extending from outer surfaces in order to carry heat away from the first pump 74, if so desired.

Mounted to the inlet chamber 82 are an inlet reed valve assembly 88 and a scavenge pump inlet cover 90. The reed valve assembly 88 is oriented to allow airflow into the inlet chamber 82 from the inlet cover 90, but prevent airflow in the opposite direction. The inlet cover 90 includes an air inlet 92, which preferably connects to the output of a compressor 97 in the turbo charger 27. The compressor 97 is connected to a driven by the turbine 25 via a turbo-shaft 94. An air intake of the compressor 97 connects to an air intake system 87 (only shown schematically). The air intake system 87 may include, for example, an air throttling valve, a mass air flow sensor, an ambient air temperature sensor, an air filter, or a combination of these and possibly other components. The air intake system may be any such system that supplies a desired volume of air at a desired pressure to the air inlet of the compressor 97 for the particular engine operating conditions.

An outlet reed valve assembly 89 and scavenge pump outlet cover 91 are mounted to the outlet chamber 86. The outlet cover 91 includes an air intake passage 93 that leads from the outlet reed valve assembly 89 to the air intake channel 31 of the first cylinder jacket 18 via the intake air passage 72 in the first air belt 60. The outlet reed valve assembly 89 is oriented to allow airflow out of the outlet chamber 86 to the air intake passage 93, but prevent airflow in the opposite direction. The inlet cover 90 and outlet cover 91 may also include cooling fins in order to further improve the cooling ability of the first scavenge pump 74, if so desired. This configuration of the scavenge pump assembly 74 allows for a size and shape consistent with the first cylinder jacket 18, allowing for integration into the first piston/cylinder assembly 14 while maintaining a compact overall engine.

The second piston/cylinder assembly 114 includes a second cylinder jacket 118, which mounts to the hydraulic pump block assembly 12. The second cylinder jacket 118 includes a second exhaust gas scroll 120 that is located adjacent to the hydraulic pump block assembly 12. The interior of the second exhaust gas scroll 120 defines an inner exhaust channel 122 that extends circumferentially around the second cylinder jacket 118 and radially outward to a second exhaust flange 124.

The exhaust flange 124 connects to the wastegate 21. Both exhaust flanges 24 and 124 lead to the same wastegate 21, and to the same turbine 25. If so desired, however, each exhaust flange may lead to a different turbine in two separate turbochargers. This would, of course, increase the cost and complexity of the air charging system.

The second cylinder jacket 118 also has a coolant inlet 126, which is located adjacent to the hydraulic pump block assembly 12, and extends into a generally circumferentially extending coolant passage 128. The coolant inlet 126 connects to the coolant cooling system (not shown).

At the opposite end of the second cylinder jacket 118 from the exhaust gas scroll 120 is a circumferentially extending air intake annulus 130, the interior of which defines an intake channel 131. Adjacent to the air intake annulus 130, the second cylinder jacket 118 forms a fuel injector boss 132, within which a second fuel injector 134 is mounted. The second fuel injector 134 is electrically connected to the electronic controller 35, which provides a signal for controlling the timing and duration of fuel injector opening. The second fuel injector 134 also connects to the fuel injector rail 37, which supplies fuel from the fuel system 39. The fuel system 39 may included, for example, a fuel tank, fuel pump and fuel lines leading to the fuel rail. Preferably, the fuel injector rail 37 also includes a fuel pressure sensor 141 that is electrically connected to the controller 35.

About mid-way between the second exhaust gas scroll 120 and the intake annulus 130, the second cylinder jacket 118 forms a pressure sensor mounting boss 136, within which is mounted a second cylinder pressure sensor 138. Both the fuel injector boss 132 and the sensor mounting boss 136 extend through the second cylinder jacket 118 to a main bore 140 that extends the length of the second cylinder jacket 118. The coolant passage 128, inner exhaust channel 122 and the air intake annulus 130 are all open into the main bore 140 as well.

The second piston/cylinder assembly 114 also includes a second cylinder liner 142, which extends through and is preferably press fit in main bore 140 of the second cylinder jacket 118. The second cylinder liner 142 includes a cylindrical shaped main bore extending therethrough that defines the second engine cylinder 144. The central axis of the second engine cylinder 144 is preferably along the axis of motion. The second cylinder liner 142 also includes a series of circumferentially spaced exhaust ports 146, which extend between and connect the second engine cylinder 144 and the inner exhaust channel 122 of the second cylinder jacket 18.

Adjacent to the exhaust ports 146, the second cylinder liner 142 abuts the coolant passage 128 in the second cylinder jacket 118. This coolant passage 128 connects to a series of spaced, helical ribs 148 that extend from the second cylinder liner 142 and abut the main bore 140 of the second cylinder jacket 118 to form a series of cylinder coolant passages 150. Within these ribs 148, a cylinder pressure tap boss 152 extends from the second engine cylinder 144 to the sensor mounting boss 136 on the second cylinder jacket 118. This allows the second cylinder pressure sensor 138 to be exposed to the second engine cylinder 144, while sealing the sensor 138 from the engine coolant.

A fuel injector bore aligns with the fuel injector boss 132 and extends through the ribs 148 to the second engine cylinder 144. This allows the second fuel injector 134 to extend through to the second engine cylinder 144 and directly inject fuel therein.

The second cylinder liner 142 also has a series of circumferentially spaced air intake ports 156, aligned with the air intake annulus 130 of the second cylinder jacket 118 and opening into the second engine cylinder 144. Again, preferably, the intake ports 156 and the exhaust ports 146 are located to created symmetrical port timing. Adjacent to the air intake ports 156, is a series of spaced oil mist holes 158, which are located circumferentially around the second cylinder liner 142.

The second piston/cylinder assembly 114 also includes a second air belt 160. The air belt 160 is mounted about the second cylinder liner 142, abutting the second cylinder jacket 118 at the location of the air intake annulus 130. An oil inlet tube 162 projects from and extends through the second air belt 160, connecting to an oil mist annulus 164. The oil mist annulus 164 abuts and extends circumferentially around the second cylinder liner 142 at the location of the oil mist holes 158. The oil supply system (not shown) connects to the oil inlet tube 162 in order to provide oil to the oil mist annulus 164.

Also abutting and extending circumferentially around the second cylinder liner 142 is a coolant annulus 166. The coolant annulus 166 connects to the cylinder coolant passages 150 and also to a coolant outlet 168 extending from the second air belt 160. This coolant outlet 168 connects to the coolant cooling system (not shown), discussed above. The second air belt 160 also has a pair of pull rod passages 170 and an intake air passage 172 that are in communication with the air intake annulus 130 of the second cylinder jacket 118.

The second piston/cylinder assembly 114 also incorporates a second scavenge pump 174. The scavenge pump 174 includes a scavenge pump housing 176 that mounts to the second air belt 160 and around the end of the second cylinder liner 142. The scavenge pump housing 176 has a main pumping chamber 178, with inlet ports 180 leading to an inlet chamber 182 and outlet ports 184 leading to an outlet chamber 186. The main pumping chamber 178 is cylindrical in shape, with preferably a generally elliptical cross section. Mounted to the inlet chamber 182 is an inlet reed valve assembly 188 and a scavenge pump inlet cover 190. The inlet cover 190 includes an air inlet 192, which preferably connects to the output of the compressor 97. The inlet reed valve assembly 188 is oriented to allow air flow into the inlet chamber 182 from the inlet cover 190, but prevent air flow in the opposite direction.

An outlet reed valve assembly 189 and scavenge pump outlet cover 191 are mounted to the outlet chamber 186. The outlet cover 191 includes an air intake passage 193 that leads from the outlet reed valve assembly 189 to the air intake channel 131 of the second cylinder jacket 118 via the intake air passage 179 in the second air belt 160. The outlet reed valve assembly 189 is oriented to allow air flow out of the outlet chamber 186 to the air intake passage 193, but prevent air flow in the opposite direction.

Contained within the two piston/cylinder assemblies 14 and 16 are two piston assemblies—an inner piston assembly 200 and an outer piston assembly 250. The inner piston assembly 200 has a first inner piston 202 that is mounted within the first engine cylinder 44, with the head 210 of the first inner piston 202 facing away from the hydraulic pump block assembly 12, and the rear 211 facing toward the hydraulic pump block assembly 12. The first inner piston 202 mounts within the first engine cylinder 44 with a small clearance between its outer diameter and the wall of the first engine cylinder 44. Accordingly, the first inner piston 202 also preferably includes three ring grooves about its periphery, with the first groove receiving a first compression ring 204, the second receiving a second compression ring 206 and the third receiving an oil control ring 208. All three of the rings 204, 206, and 208 are sized to seal against the wall of the first engine cylinder 44.

The first inner piston 202 also preferably includes a series of generally axially extending bores 212—extending from the rear 211 of the piston 202 toward the head 210. Each bore 212 is preferably partially filled with a sodium compound and has a cap 214 for sealing the sodium compound in the bore 212.

The inner piston assembly 200 further includes a second inner piston 220 that is mounted within the second engine cylinder 144, with the head 222 of the second inner piston 220 facing away from the hydraulic pump block assembly 12 and the rear 223 facing toward the hydraulic pump block assembly 12. The second inner piston 220 mounts within the second engine cylinder 144 with a small clearance between its outer diameter and the wall of the second engine cylinder 144. Accordingly, the second inner piston 220 also preferably includes three ring grooves about its periphery, with the first groove receiving a first compression ring 224, the second receiving a second compression ring 226 and the third receiving an oil control ring 228. All three of the rings 224, 226, and 228 are sized to press and seal against the wall of the second engine cylinder 144.

The second inner piston 220 also preferably includes a series of generally axially extending bores 230—extending from the rear 223 of the inner piston 220 toward the head 222. Each bore 230 is preferably partially filled with a sodium compound and has a cap 232 for sealing the sodium compound in the bore 230.

The first inner piston 202 includes a centrally located, axially extending bore 216 therethrough that receives a fastener 218, and the second inner piston 220 also includes a centrally located, axially extending bore 234 therethrough that receives a fastener 236. The fasteners 218 and 236 are each threaded to respective ends of a push rod 240, which extends through the hydraulic pump block assembly 12. The push rod 240, being fixed to each inner piston 202 and 220, causes the two pistons 202 and 220 to move in unison, preferably along the axis of motion. The push rod 240 also includes an enlarged diameter region, which forms an inner plunger 242. The inner plunger 242 is located midway between the two pistons 202 and 220. The purpose of the inner plunger 242 will be discussed below with reference to the hydraulic pump block assembly 12.

The inner piston assembly 200 also preferably includes a first guide rod 244 and a second guide rod 245, with each extending through the hydraulic pump block assembly 12 to connect between the rear faces 211 and 223 of the first and second inner pistons 202 and 220. The guide rods 244 and 245 keep the inner piston assembly 200 from rotating during engine operation. Also, preferably, at least one, and more preferably, both of the guide rods 244 and 245 include position sensor indices that can be employed to determine the axial position of the inner piston assembly 200 during engine operation. Such indices may take the form of a first set of one or more copper rings 246 fixed around the first guide rod 244. The second guide rod 245 also preferably includes indices, such as a second set of cooper rings 247. The second guide rod 245 can then be employed as part of a position calibration sensor for assuring that the position sensor on the first guide rod 244 is reading the axial position of the inner piston assembly 200 accurately.

The outer piston assembly 250 has a first outer piston 252 that is mounted within the first engine cylinder 44, with the head 254 of the first outer piston 252 facing toward the head 210 of the first inner piston 202, and the rear 256 facing toward the first scavenge pump main chamber 78. The first outer piston 252 mounts within the first engine cylinder 44 with a small clearance between its outer diameter and the wall of the first engine cylinder 44. Accordingly, the first outer piston 252 also preferably includes three ring grooves about its periphery, with the first groove receiving a first compression ring 258, the second receiving a second compression ring 260 and the third receiving an oil control ring 262. All three of the rings 258, 260, and 262 are sized to seal against the wall of the first engine cylinder 44.

Mounted on the rear 256 of the first outer piston 252 is a first piston bridge 264. The first piston bridge 264 includes an outer, generally elliptical shaped portion 266 that is in sliding contact with and seals against the wall of the main pumping chamber 78 of the first scavenge pump 74. The minor diameter of the elliptical portion 266 is preferably slightly smaller than the diameter of the head 254 of the first outer piston 252, while the major diameter of the elliptical portion 266 is significantly larger than the diameter of the head 254. A first pull rod boss 268 and a second pull rod boss 269 are located along the major diameter of the elliptical portion 266, radially outward of the outer diameter of the first outer piston 252.

The first piston bridge 264 moves with and in essence forms a portion of the first outer piston 252. Thus, no extra assemblies are required for transmitting the combustion piston forces to the scavenge pump. Moreover, the oval shape of the first piston bridge 264 and corresponding main pumping chamber 78 allow for pull rods (discussed below) to be located outside of the engine cylinders 44 and 144, while minimizing the weight of the outer piston assembly 250. With this configuration, the first outer piston 252 acts as a combustion piston in the first engine cylinder 44, while the first piston bridge 264 acts as a scavenge pump piston in the main pumping chamber 78 of the first scavenge pump 74. Thus, one obtains more than a one-to-one ratio of the outer piston cross sectional area to the scavenge pump piston cross sectional area.

A guide post boss 270 is located in the center of the first piston bridge 264. A first guide post 271 is fixed to and extends from the first scavenge pump housing 76. The first guide post 271 also slides telescopically within the guide post boss 270. The guide post boss 270 will then slide on the guide post 271 during engine operation, maintaining proper orientation of the first outer piston 252 as it slides in the first engine cylinder 44.

A web portion of the first piston bridge 264 is open around the guide post boss 270, but closed adjacent to the pull rod bosses 268 and 269. The open area of the web portion creates an opening between the interior of the hollow first outer piston 252 and the main pumping chamber 78, thus effectively increasing the volume of the main pumping chamber 78. The closed areas of the web are located radially outward of the outer diameter of the first outer piston 252. The closed areas of the web allow for the creation of a secondary pumping action, pumping air through the pull rod passages 70 and onto the intake channel 31 when the first piston bridge 264 is moving toward top dead center.

The outer piston assembly 250 also has a second outer piston 275 that is mounted within the second engine cylinder 144, with the head 276 of the second outer piston 275 facing toward the head 222 of the second inner piston 220, and the rear 277 facing toward the second scavenge pump main chamber 178. The second outer piston 275 mounts within the second engine cylinder 144 with a small clearance between its outer diameter and the wall of the second engine cylinder 144. Accordingly, the second outer piston 275 also preferably includes three ring grooves about its periphery, with the first groove receiving a first compression ring 278, the second receiving a second compression ring 279 and the third receiving an oil control ring 280. All three of the rings 278, 279, and 280 are sized to seal against the wall of the second engine cylinder 144.

Mounted on the rear 277 of the second outer piston 275 is a second piston bridge 282. The second piston bridge 282 includes an outer, generally elliptical shaped portion 283 that is in sliding contact with and seals against the wall of the main pumping chamber 178 of the second scavenge pump 174. The minor diameter of the elliptical portion 283 is preferably slightly smaller than the diameter of the head 276 of the second outer piston 275, while the major diameter of the elliptical portion 283 is significantly larger than the diameter of the head 276. A first pull rod boss 284 and a second pull rod boss 285 are located along the major diameter of the elliptical portion 283, radially outward of the outer diameter of the second outer piston 275. The second outer piston 275 acts as a combustion piston in the second engine cylinder 144, while the second piston bridge 282 acts as a scavenge pump piston in the main pumping chamber 178 of the second scavenging pump 174.

A guide post boss 286 is located in the center of the second piston bridge 282. A second guide post 287 is fixed to and extends from the second scavenge pump housing 176. The second guide post 287 also slides telescopically within the guide post boss 286. The guide post boss 286 will then slide on the guide post 287 during engine operation, maintaining proper orientation of the second outer piston 275 as it slides in the second engine cylinder 144.

The second guide post 287 also forms part of a position sensor assembly 288. The position sensor assembly 288 includes a sensor rod 289, which has at least one index location 290, affixed to and slidable with the second outer piston 275. A sensor 291 mounts about the sensor rod 289 and extends through the second scavenge pump housing 176, where an electrical connector 292 will connect the sensor 291 to the electronic controller 35. The controller 35 can use the output from the sensor 291 to determine the position and velocity of the outer piston assembly 250.

The second piston bridge 282 includes a web portion that is open around the guide post boss 286 and closed adjacent to the pull rod bosses 284 and 285. The open area of the web portion creates an opening between the interior of the hollow second outer piston 275. The closed areas of the web allow for the creation of a secondary pumping action, forcing air through the pull rod passages 170 and into the intake channel 131 when the second piston bridge 282 is moving toward top dead center.

The outer piston assembly 250 also includes a first pull rod 293 and a second pull rod 294. The first pull rod 293 connects between the first pull rod boss 268 on the first piston bridge 264 and the first pull rod boss 284 on the second piston bridge 282. Since the bridges 264 and 282 are elliptical, the first pull rod 293 can couple them together and allow for movement parallel to the axis of motion without interfering with the operation of the engine cylinders.

The first pull rod 293 includes an enlarged diameter region, which forms a first outer plunger 295. The first outer plunger 295 is located in the hydraulic pump block assembly 12 mid-way between the first piston-bridge 264 and the second piston-bridge 282. A first pull rod sleeve 272 extends about the first pull rod 293 between the hydraulic pump block assembly 12 and the first cylinder jacket 18, and a second pull rod sleeve 273 extends about the first pull rod 293 between the hydraulic pump block assembly 12 and the second cylinder jacket 118. The pull rod sleeves 272 and 273 assure that the first pull rod 293 is entirely enclosed by engine components, thus preventing contaminants from contacting and interfering with the operation of the first pull rod 293.

The second pull rod 294 connects between the second pull rod boss 269 on the first piston bridge 264 and the second pull rod boss 285 on the second piston bridge 282. The second pull rod 294 includes an enlarged diameter region, which forms a second outer plunger 296. The second outer plunger 296 is located in the hydraulic pump block assembly 12 mid-way between the first piston-bridge 264 and the second piston-bridge 282. A third pull rod sleeve 274 extends about the second pull rod 294 between the hydraulic pump block assembly 12 and the first cylinder jacket 18. And, preferably, a position sensing pull rod sleeve 281 extends about the second pull rod 294 between the hydraulic pump block assembly 12 and the second cylinder jacket 118. The pull rod sleeves 274 and 281 assure that the second pull rod 294 is entirely enclosed by engine components, thus preventing contaminants from contacting and interfering with the operation of the second pull rod 294.

Additionally, the second pull rod 294 preferably includes spaced copper rings 298 mounted thereon and located within the position sensing pull rod sleeve 281. The position sensing pull rod sleeve 281 preferably includes a sensor assembly 297 located in close proximity to the copper rings 298. The sensor assembly 297 is then connected to the controller 35, and will detect the position of the copper rings 298. The controller 35 can then use the output from the sensor assembly 297 to calibrate the other sensor 291, thus assuring an accurate measurement of the position and velocity of the outer piston assembly 250.

It is preferable for the engine 10 to be balanced in order to assure optimal operating characteristics. For the engine to be balanced, the total mass of the outer piston assembly 250—that is, all of the parts that move with the outer pistons 252 and 275—equal the total mass of the inner piston assembly 200—that is, all of the parts that move with the inner pistons 202 and 220. Also, preferably, for a balanced engine, the hydraulic area of the inner plunger 242 of the push rod 240 is equal to the sum of the hydraulic areas of the outer plungers 295 and 296 of the pull rods 292 and 294—with the hydraulic area of the first outer plunger 295 being equal to the hydraulic area of the second outer plunger 296. Accordingly, the materials for the different components in the piston assemblies 200 and 250 are chosen to assure adequate thermal and strength characteristics while also balancing the masses of the assemblies. For example, the inner pistons 202 and 220, and the push rod 240 may be made of cast iron, the pull rods 293 and 294 also made of cast iron, while the outer pistons 252 and 275 are made of aluminum and the elliptical shaped bridges 264 and 282 are made of steel. Although, other suitable materials may be employed, if desired. In addition, the oval shape of the piston bridges 264 and 282 allow the pull rods 292 and 294 to be supported outside of the engine cylinders 44 and 144, while minimizing the weight of the outer piston assembly 250.

As discussed above, the hydraulic pump block assembly 12 mounts between the first piston/cylinder assembly 14 and the second piston/cylinder assembly 16. It includes a pump block 302, preferably made of steel, through which various hydraulic porting and passages, coolant passages and lubrication oil sump and passages are formed.

The pump block 302 includes a push rod bore 304 through which the push rod 240 extends. The inner plunger 242 seals circumferentially around the push rod bore 304. Both ends of the central bore 304 also seal against the push rod 240—one end employing a seal plug 309 to create the seal. These seals form an inner pumping chamber 306 on one side of the inner plunger 242 and an inner coupler-pumping chamber 308 on the other side of the inner plunger 242.

The pump block 302 also includes a first pull rod bore 310 through which the first pull rod 293 extends, and a second pull rod bore 312 through which the second pull rod 294 extends. The first outer plunger 295 seals circumferentially around the first pull rod bore 310 and the second outer plunger 296 seals circumferentially around the second pull rod bore 312. The first pull rod bore 310 is shaped to seal, at each end, against the first pull rod 293, with a seal plug 311 again employed at one end for sealing. The pull rod bore 310, in conjunction with the first pull rod 293, forms a first outer pumping chamber 314 on one side of the first outer plunger 295, and a first outer coupler pumping chamber 316 on the other side of the first outer plunger 295. The second pull rod bore 312 is shaped to seal, at each end, against the second pull rod 294, with a seal plug 313 again employed at one end for sealing. The second pull rod bore 312, in conjunction with the second pull rod 294, forms a second outer pumping chamber 318 on one side of the second outer plunger 296, and a second outer coupler pumping chamber 320 on the other side of the second outer plunger 296.

The inner coupler-pumping chamber 308 and the first outer coupler-pumping chamber 316 are connected with a first cross-connecting passage 322. In addition, the inner coupler pumping chamber 308 and the second outer coupler pumping chamber 320 are connected with a second cross connecting passage 323. Consequently, the three-coupler pumping chambers 308, 316 and 320 are always in open fluid communication with each other.

A low-pressure passage 324, with a restriction 326, leads from the second cross connecting passage 323 to a first coupler adjustment valve 328. The first coupler adjustment valve 328 is connected to the low-pressure reservoir 330 side of the hydraulic system 329. It can be switched between a position that allows fluid flow from the second cross connecting passage 323 to the low pressure reservoir 330, and a position that blocks such fluid flow. A high-pressure passage 332, with a restriction 334, leads from the first cross connecting passage 322 to a second coupler adjustment valve 336. The second coupler adjustment valve 336 is connected to the high-pressure reservoir 338 side of the hydraulic system 329. It can be switched between a position that allows fluid flow from the high pressure reservoir 338 to the first cross connecting passage 322, and a position that blocks such fluid flow. The first and second coupler adjustment valves 328 and 336 are electrically connected to and operated by the electronic controller 35.

A resonator passage 340 extends between the second cross connecting passage 323 and a Helmholtz resonator 342, which is mounted on the pump block 302. The Helmholtz resonator 342 is tuned to damp pulsations that occur as the fluid flows back and forth between the coupler pumping chambers 308, 316 and 320 through the cross connecting passages 322 and 323. The Helmholtz resonator 342 may be eliminated from the engine 10, if so desired.

These cross connecting passages 322 and 323, together with the hydraulic components connected to them, form a hydraulic circuit that hydraulically couples the movement of the inner piston assembly 200 with the outer piston assembly 250. Since, with the coupler adjustment valves 328 and 336 closed, the volume in the coupler pumping chambers 308, 316 and 320, and the cross connecting passages 322 and 323, is filled with an essentially incompressible liquid (such as hydraulic oil), this volume will remain constant. Also, as noted above, the inner plunger 242 of the push rod 240 is sized to displace twice the volume of fluid (per amount of linear movement) as each of the outer plungers 295 and 296 of the pull rods 293 and 294, respectively. Consequently, if the inner piston assembly 200 moves one millimeter to the right, displacing fluid out of the inner coupler pumping chamber 308, then the outer piston assembly 250 must move one millimeter to the left, in order to receive that amount of fluid in the two outer coupler pumping chambers 316 and 320. This assures that, even though the motions of the inner piston assembly 200 and the outer piston assembly 250 are not mechanically fixed, they will move in virtually exact opposition to each other. Consequently, the top dead center and bottom dead center positions for the two piston assemblies 200 and 250 are reached simultaneously.

The first and second coupler adjustment valves 328 and 336 allow for the addition or removal of some of the fluid from the couplers should leakage around any seals change the volume of the fluid retained in the couplers. While this hydraulic system for coupling the piston assemblies 200 and 250 has been described, other mechanisms for assuring that the piston assemblies 200 and 250 move opposed to one another may be employed if so desired.

The hydraulic pump block assembly 12 also includes a pair of oil inlets 344 and 345 that extend through the pump block 302 to an oil sump 346 to located on the underside of the pump block 302. The oil sump 346 is open to various moving components in the pump block assembly 12 in order to allow for splash lubrication of the moving components—particularly the portion of the cylinder walls 44 and 144 along which the first and second inner pistons 202 and 220 slide. The oil sump 346 also includes an oil return outlet 348. The oil inlets 344 and 345, and the oil return outlet 348 are connected to the oil supply system (not shown). The oil sump 346 also allows for air to move back and forth behind the inner pistons 202 and 220 as they reciprocate during engine operation.

Two coolant inlets 350 are mounted on the bottom of the pump block 302. The coolant inlets 350 connect to a series of coolant passages 352 that extend throughout the pump block 302, which then connect to two coolant outlets 354 mounted on the top of the pump block 302. The coolant inlets 350 and the coolant outlets 354 connect to the coolant cooling system (not shown). The coolant flowing through the pump block 302 will assure that the moving parts do not overheat during engine operation.

The hydraulic pump block assembly 12 also includes a low pressure rail 356, mounted on top of the pump block 302, that includes a low pressure rail port 358 connected through a hydraulic line to the low pressure reservoir 330. The low pressure rail 356 opens to three sets of one-way low pressure check valves, an inner set 360, a first outer set 362 and a second outer set 363. The inner set of check valves 360 connects through a passage 364 to the inner pumping chamber 306, with the valve set 360 only allowing fluid flow from the low pressure rail 356 to the inner pumping chamber 306. The first outer set of check valves 362 connects through a passage 365 to the first outer pumping chamber 314, with the valve set 362 only allowing fluid flow from the low pressure rail 356 to the first outer pumping chamber 314. The second outer set of check vales 363 likewise connects through a passage 366 to the second outer pumping chamber 318, with the valve set 363 only allowing fluid flow from the low pressure rail 356 to the second outer pumping chamber 318. While the inner set of check valves 360 includes four individual valves and each of the outer sets of check valves 362 and 363 includes two valves, different numbers of individual valves can be employed, if so desired. But preferably, the inner set 360 provides for twice the valve open area as each of the outer sets 362 and 363 since the inner plunger 242 has twice the pumping capacity as either of the outer plungers 295 and 296.

A high pressure rail 368 mounts to the bottom of the pump block 302 and includes a high pressure rail port 369 connected through a hydraulic line to the high pressure reservoir 338. The high pressure rail 368 opens to three one-way high pressure check valves, an inner check valve 370, a first outer check valve 371 and a second outer check valve 372. The inner check valve 370 connects to the inner pumping chamber 306 via a fluid passage 373, with the check valve 370 only allowing fluid flow from the inner pumping chamber 306 to the high pressure rail 368. The first outer check valve 371 connects to the first outer pumping chamber 314 via a fluid passage 374, with the check valve 371 only allowing fluid flow from the first outer pumping chamber 314 to the high pressure rail 368. The second outer check valve 372 connects to the second outer pumping chamber 318 via a fluid passage 375, with the check valve 372 only allowing fluid to flow from the second outer pumping chamber 318 to the high pressure rail 368. Again, the inner check valve 370 preferably has twice the opening area as each of the outer check valves 371 and 372.

The low-pressure rail 356 preferably includes a pressure sensor 376 mounted therein for measuring the pressure of the fluid in the low-pressure rail 356. The high-pressure rail 368 likewise preferably includes a pressure sensor 377 mounted therein for measuring the pressure of the fluid in the high-pressure rail 368. Both of the pressure sensors 376 and 377 are electrically connected to the electronic controller 35, for receiving and processing the pressure signals.

Mounted on top of the pump block 302, adjacent to the low-pressure rail 356, is a hydraulic starting and control valve 379. This hydraulic starting and control valve 379 is only shown schematically herein, but is preferably a hydraulic valve such as, for example, a Moog hydraulic control valve part number 35-196-4000-1-4PC-2-VIT, made by Moog Inc. of East Aurora, N.Y. The control valve 379 engages four ports on the pump block 302, a high pressure port 380, a low pressure port 381, an inner pumping chamber port 382 and an outer pumping chamber port 383. The high-pressure port 380 is connected through a fluid passage to the high-pressure rail 368, and the low-pressure port 381 is connected through a fluid passage to the low pressure rail 356. The inner pumping chamber port 382 connects through a first starting/spilling fluid passage 384 to the inner pumping chamber 306, while the outer pumping chamber port 383 connects through a second starting/spilling fluid passage 385 to the two outer pumping chambers 314 and 318.

The control valve 379 can operate to hydraulically connect the high pressure port 380 with the inner pumping chamber port 382, while at the same time connecting the low pressure port 381 with the outer pumping chamber port 383. The control valve 379 can also operate to hydraulically connect the low pressure port 381 with the inner pumping chamber port 382, while at the same time connecting the high pressure port 380 with the outer pumping chamber port 383. Under a third operating condition, the control valve 379 will block the flow of fluid between the high and low pressure ports 380 and 381 and both the inner and the outer pumping chamber ports 382 and 383. The electronic controller 35 preferably controls which operating state the control valve 379 is in.

The hydraulic pump block assembly 12 may also include piston stops, which set a maximum distance at each end of travel for the pistons. These stops may be needed due to the fact that the piston motion is determined by a balance of the forces—rather than a fixed mechanical path—for a free piston engine. Piston stops for the inner piston assembly 200 preferably include radially stepped portions 388 spaced on either side of the inner plunger 242 of the push rod 240, with matching stops 389 located at each end of the central bore 304—on the pump block 302 and the seal plug 309. The relative position of the stepped portions 388 to the stops 389 will determine the maximum travel of the inner piston assembly 200 in either direction. If the stepped portions 388 engage the stops 389, the piston motion in that direction will stop.

Piston stops for the outer piston assembly 250 preferably include radially stepped portions 390 and 391 spaced on either side of the outer plungers 295 and 296 of the first and second pull rods 293 and 294, respectively. The pump block 302 and seal plugs 311 and 313, in a similar fashion to the inner piston assembly 200, will include matching stops 392 and 393, located on opposite ends of the first and second pull rod bores 310 and 312, respectively.

As an alternative, the piston stops may be eliminated. With this alternative configuration, the head 210 of the first inner piston 202 hitting the head 254 of the first outer piston 252 will act as a stop in one direction, while the head 222 of the second inner piston 220 hitting the head 276 of the second outer piston 275 will act as a stop in the other direction. While this may at first seem undesirable, the piston heads have relatively large surface areas for contact, and, the pressure within the cylinder where the pistons are acting as stops will rise dramatically just prior to collision, thus slowing the speed at impact.

The hydraulic pump block assembly 12 also preferably includes a pair of position sensors. A first position sensor 395 is mounted in the pump block 302 surrounding the portion of the first guide rod 244 that includes the first set of copper rings 246. Preferably, a second position sensor 396 is mounted in the pump block 302 surrounding the portion of the second guide rod 245 that includes the second set of copper rings 247. The position sensors 395 and 396 are electrically connected and provide position signals to the electronic controller 35. With the sensor information from the first position sensor 395, the electronic controller 35 can determine the position and velocity of the inner piston assembly 200. The information from the second position sensor 396 is preferably used for calibration of the first position sensor 395 in order to assure accurate position measurements.

The operation of the engine 10 will now be described. Since this engine 10 is a free piston engine, the piston motion is determined by a balance (equilibrium) of forces acting on the piston assemblies 200 and 250. For example, the major forces are generally in-cylinder pressures of the opposed engine cylinders 44 and 144, the friction created by the various moving parts, the air scavenging, the inertia of the moving piston assemblies 200 and 250, and any loads caused by the plungers 242, 295 and 296. Consequently, the piston assemblies 200 and 250 each must receive input forces at the appropriate time and amount in order to cause sustained reciprocal piston motion. This reciprocal motion must be sufficient to obtain the needed compression in the cylinders 44 and 144 for the combustion process. By employing inputs to control the motion of the piston assemblies 200 and 250, especially near the end of travel for each stroke, the piston top dead center positions, and hence the compression ratio, can be controlled. Moreover, the ability to vary the compression ratio makes HCCI combustion much more feasible, since the compression ratio needed to cause combustion can vary based on engine operating conditions. Since the balance of forces must be precisely timed and controlled, the electronic controller 35 monitors and actuates the engine components that are critical for efficient and sustained engine operation.

Prior to engine start-up, the high-pressure reservoir 338 of the hydraulic system 329 retains a hydraulic fluid under a relatively high pressure, which may be, for example, 5,000 to 6,000 pounds per square inch (PSI). The low-pressure reservoir 330 of the hydraulic system 329 retains hydraulic fluid under a relatively low pressure, which may be, for example, 50 to 60 PSI. Although, other ranges of relative pressures can be employed, if so desired.

Upon initiation of the engine starting process, the electronic controller 35 energizes the starting and control valve 379, alternating between a first valve position with the high pressure port 380 open to the inner pumping chamber port 382 and the low pressure port 381 open to the outer pumping chamber port 383, and a second valve position with the high pressure port 380 open to the outer pumping chamber port 383 and the low pressure port 381 open to the inner pumping chamber port 382.

In the first valve position of the control valve 379, fluid from the high pressure reservoir 338 will be pushed into the inner pumping chamber 306, causing the inner plunger 242 of the push rod 240, and hence the entire inner piston assembly 200, to begin moving to the right (as illustrated in the figures herein). This will cause the fluid in the inner coupler pumping chamber 308 to be pushed through the first and second cross connecting passages 322 and 323 and into the first and second outer coupler pumping chambers 316 and 320. This, in turn, will cause the first and second outer plungers 295 and 296 of the first and second pull rods 293 and 294, respectively, and hence the entire outer piston assembly 250, to begin moving to the left (as illustrated in the figures herein). As the outer piston assembly 250 moves to the left, fluid from the first and second outer pumping chambers 314 and 318 will be pushed through the control valve 379 and into the low pressure reservoir 330.

This opposed movement of the two piston assemblies 200 and 250 will cause the first outer piston 252 and first inner piston 202 to simultaneously move apart toward their bottom dead center positions in the first engine cylinder 44, while the second outer piston 275 and second inner piston 220 will move simultaneously at one another toward their top dead center positions in the second engine cylinder 144. Both piston assemblies 200 and 250 move back and forth along a single, linear axis of motion. The single axis of motion extends through the center of the two engine cylinders 44 and 144, as indicated by the double arrows shown in the engine cylinders 44 and 144 in FIGS. 10 and 11.

In the second valve position of the control valve 379, fluid from the high pressure reservoir 338 will be pushed into the first and second outer pumping chambers 314 and 318, causing the first and second outer plungers 295 and 296 of the first and second pull rods 293 and 294, respectively, and hence the entire outer piston assembly 250, to begin moving to the right. This will cause the fluid in the first and second outer coupler pumping chambers 316 and 320 to be pushed through the first and second cross connecting passages 322 and 323 and into the inner coupler pumping chamber 308. This will, in turn, cause the inner plunger 242 of the push rod 240, and hence the entire inner piston assembly 200, to begin moving to the left. As the inner piston assembly 200 moves to the left, fluid from inner pumping chamber 306 will be pushed through the control valve 379 and into the low pressure reservoir 330.

This opposed movement of the two piston assemblies 200 and 250 will cause the first outer piston 252 and first inner piston 202 to simultaneously move at one another toward their top dead center positions in the first engine cylinder 44, while the second outer piston 275 and second inner piston 220 will move simultaneously away from one another toward their bottom dead center positions in the second engine cylinder 144.

By precisely and rapidly switching between the three valve positions of the starting and control valve 379, the piston assemblies 200 and 250 can be made to alternately switch between causing compression in the first engine cylinder 44 and causing compression in the second engine cylinder 144. The electronic controller 35, by monitoring the position sensors 288 and 395, determines the position and velocity of both piston assemblies 200 and 250. The position and velocity information is then employed by the controller 35 to determine the appropriate timing for the switching of the starting and control valve 379 in order cause the desired amount of compression ratio in the engine cylinders 44 and 144. One can see from this discussion, then, that the starting and control valve 379 controls the movement of the piston assemblies 200 and 250 at engine start-up in a way that will cause the piston assemblies 200 and 250 to move as needed for engine operation.

The engine 10 operates as a two stroke engine, and without any separate valve system to open and close the intake and exhaust ports of the engine cylinders 44 and 144. Thus, the compression, combustion (which includes ignition), expansion, and gas exchange (which includes intake and exhaust) of the fuel/air mixture is accomplished over two strokes of the pistons. This arrangement minimizes the number of moving parts as well as minimizing the total package size of the engine 10. In order to operate such an engine effectively and efficiently, however, a positive gas exchange pressure difference—that is, higher intake boost pressure than exhaust back pressure—is desirable. The air charging system disclosed herein can provide such an intake boost pressure.

The movement of the inner piston assembly 200 causes the inner pistons 202 and 220 to selectively block and open the exhaust ports 46 and 146 to the respective engine cylinders 44 and 144. The movement of the outer piston assembly 250 causes the outer pistons 252 and 275 to selectively block and open the intake ports 56 and 156 to the respective engine cylinders 44 and 144, as well as causing the piston bridges 264 and 282 to charge the intake air. The movement of the outer piston assembly 250 also causes the outer pistons 252 and 275 to selectively block and expose the fuel injectors 34 and 134, respectively, to the engine cylinders 44 and 144. Consequently, the motion of the inner and outer piston assemblies 200 and 250 caused by the starting and control valve 379 provides the movement needed to bring air charges into the engine cylinders 44 and 144, allow for fuel to be supplied into the cylinders to mix with the charge air, and provide compression sufficient for combustion to occur. Although, for the initial combustion event, there is no exhaust gasses to drive the turbocharger 27. This can be addressed by adjusting the compression ratio, fueling, or other parameters until the exhaust can drive the turbine 25.

Preferably, the combustion process under normal operating conditions is a homogeneous charge, compression ignition (HCCI) type, which takes advantage of the variable compression ratio capability of this engine 10 to allow for this very high efficiency type of combustion. The HCCI process employs a homogeneous air/fuel charge mixture that is auto-ignited due to a high compression ratio; that is, pre-mixed fuel/air charges are compression heated to the point of auto-ignition (also called spontaneous combustion). With the auto-ignition caused by the HCCI process, there are numerous ignition points throughout the fuel/air mixture to assure rapid combustion, which allows for low equivalence ratios (the ratio of the actual fuel-to-air ratio to the stoichiometric ratio) to be employed since no flame propagation is required. This results in improved thermal efficiency while reducing peak cylinder temperatures, significantly reducing the formation of oxides of nitrogen versus the more conventional types of internal combustion engines.

More specifically, the intake, compression, combustion and exhaust events will be described for the first engine cylinder 44 (being equally applicable to the second engine cylinder 144) during normal HCCI engine operation. The movement of the first outer piston 252 charges the intake air as well as determines the timing and duration of the air intake ports 56 and first fuel injector 34 being open to the first engine cylinder 44. As the first outer piston 252 moves toward its top dead center position, the volume in the main pumping chamber 78 of the first scavenge pump 74 increases, causing air to be pulled in through the inlet reed valves 94. This air pulled through the reed valves 94 will have already received a pressure boost from the compressor 97. At the same time, the closed areas of the web of the first piston bridge 264 compress air through the pull rod passages 70, intake channel 31 and air intake ports 56, and into the first engine cylinder 44; and this flow will occur until the first outer piston 252 completely covers the air intake ports 56. Although the air intake channel 31 already contains compressed air due to the main scavenge pump operation, as discussed below, the web will help force more of it into the first engine cylinder 44 with this secondary pumping action. Thus, the scavenge pump 74 provides a significant boost to the intake air pressure, increasing the density of the air intake charge.

After top dead center—typically after a combustion event—the movement of the first outer piston 252 will cause a reduction in volume in the main pumping chamber 78, causing the air to be further compressed and forced out through the outlet reed valves 95 and into the air intake passages 93 and 72 and the intake channel 31. As the first outer piston 252 continues to move toward its bottom dead center position, it will expose the air intake ports 56, allowing the compressed air to flow into the first engine cylinder 44 from the intake channel 31. The first fuel injector 34 is also exposed to the first engine cylinder 44 at this time. The controller 35 will activate the first fuel injector 34, causing fuel to be sprayed into the incoming air charge. The outer piston position sensor 291 is employed by the controller 35, as well as the fuel pressure sensor 41, in order to determine the timing and duration of fuel injector actuation.

After reaching bottom dead center, the first outer piston 252 moves toward the top dead center position again. During this movement, the first outer piston 252 will close off the air intake ports 56 and the fuel injector bore 54 from the first engine cylinder 44. The air/fuel charge is compressed in the engine cylinder 44 as the first outer piston 252 continues to move toward the top dead center position. One will note that the first fuel injector 34 injects directly into the first engine cylinder 44, yet it is not directly exposed to the combustion event since it is covered by the first outer piston 252 when the piston 252 is at or near top dead center.

The movement of the first inner piston 202 determines the timing and duration of the exhaust ports 46 being open to the first engine cylinder 44. As the first inner piston 202 moves away from top dead center—typically after a combustion event—the piston 202 will move past the exhaust ports 46, allowing the exhaust gases to flow out through the exhaust ports 46. Preferably, the exhaust ports 46 will begin to open at about the same time as the air intake ports 56 begin to open, (due to the symmetrical port timing). The exhaust gasses will then flow through the first exhaust gas scroll 20 and through the wastegate 21. The wastegate 21 will direct the exhaust flow through the turbine 25, which will drive the compressor 97 via the turboshaft 94, and then flow through the exhaust system 29. If the intake air pressure is higher the desirable, then the wastegate 21 will switch to bleed some or all of the exhaust flow through the bypass 23. The controller 35 controls the wastegate 21.

After bottom dead center, the first inner piston 202 moves toward top dead center and, part of the way through this stroke, will cover the exhaust ports 46, effectively closing them. Any exhaust gasses that have not flowed out through the exhaust ports 46 at this time will remain in the cylinder 44 as internal exhaust gas recirculation (EGR) during the next combustion event. As the first inner piston 202 continues to move toward top dead center, the air/fuel charge is compressed in the first engine cylinder 44.

Since the second engine cylinder 144 operates opposed to the first engine cylinder 44, the combustion event in the first engine cylinder 44 will cause the first inner and outer pistons 202 and 252 to be driven apart while the combustion event in the second engine cylinder 144 will cause the first inner and outer pistons 202 and 252 to move toward one another (causing compression in the first cylinder 44), thereby continually perpetuating the engine operating cycle. This includes continuously charging the intake air for both engine cylinders 44 and 144 by driving the turbocharger 27 and the scavenger pumps 74 and 174. Thus, the intake boost pressure will be maintained higher than the exhaust backpressure, even under HCCI operating conditions, which tend to reduce the exhaust gas temperature. The lower the exhaust gas temperature, the lower the positive gas exchange pressure difference tends to be for a given intake boost pressure.

The self-sustaining operation of the engine 10 is preferably maintained by controlling the fuel injection prior to each of the combustion events, taking into account the various operating conditions under which the engine 10 is operating at the time. The fuel injection control can be used to control the length of the piston stroke, which must be enough to obtain the compression ratio needed for combustion but avoid collisions with the piston stops. Of course, to allow for transient conditions, occasional non-combustion events, system imbalances, and other factors, the starting and control valve 379 can be employed at times, in combination with the fuel control, to correct the piston motion. This includes assuring not only the appropriate compression ratio is reached for the given engine operating conditions, but also that the auto-ignition occurs at or just after the top dead center positions in order to avoid wasting combustion energy changing the direction of the motion of the piston assemblies 200 and 250.

During normal engine operation, as the combustion events cause the piston assemblies 200 and 250 to reciprocate, the push rod 240 and pull rods 293 and 294 will drive the plungers 242, 295, and 296 back and forth in their respective bores 304, 310, and 312. As the inner piston assembly 200 moves to the right (as seen in the figures), movement of the inner plunger will cause the inner set of low pressure check valves 360 to open, allowing fluid from the low pressure rail 356 to be drawn into the inner pumping chamber 306. The fluid leaving the low-pressure rail 356 is replenished from the low-pressure reservoir 330. The amount of fluid maintained within the low pressure rail 356 and the ability of the low pressure reservoir 330 to refill the low pressure rail 356 must be sufficient to maintain the fluid flow through the sets of low pressure check valves. Otherwise, cavitation problems can occur.

At the same time, the outer piston assembly 250 moves to the left, with the outer plungers 295 and 296 causing the fluid in the first and second outer pumping chambers 314 and 318 to be pumped through the first and second outer high pressure check valves 371 and 372 to the high pressure rail 368. This displaces fluid into the high pressure reservoir 338. This fluid under pressure in the high-pressure reservoir 338 is then available as a stored energy source for the engine operation as well as driving other components and systems. Since the hydraulic fluid energy available is a function of the pressure level and the amount of hydraulic fluid flow, one can use the desired energy output when deciding upon the piston stroke, the piston frequency and/or the dimensions of the hydraulic fluid plungers when initially laying out the dimensions for the engine. For the piston frequency, generally, the higher the mass of the moving piston assemblies, the lower the optimal operating frequency of the engine.

During the engine stroke that causes the inner piston assembly 200 to move to the right, the inner plunger 242 pumps fluid from the inner coupler-pumping chamber 306 to the two outer coupler-pumping chambers 316 and 320. As discussed above, this allows the two-piston assemblies 200 and 250 to maintain an opposed motion to one another. If the position sensors 288 and 395 detect that the two piston assemblies 200 and 250 are not centered appropriately in the engine cylinders, then one of the coupler adjustment valves 328 and 336 can be activated to correct for the offset.

During the following engine stroke, as the inner piston assembly 200 moves to the left, the fluid pressure created by the inner plunger 242 will open the inner high pressure check valve 370, forcing fluid to flow to the high pressure rail 368 and on to the high pressure reservoir 338. The outer piston assembly 250 simultaneously moves to the right, with the outer plungers 295 and 296 causing fluid to be drawn from the low pressure rail 356 through the first and second outer sets of low pressure check valves 362 and 363. During this engine stroke, the outer plungers 295 and 296 also pump fluid from the outer coupler pumping chambers 316 and 320 to the inner coupler pumping chamber 306.

In addition to the operation of the subsystems that are internal to the engine, of course, the external systems will also function during engine operation as needed to maintain the operation of the engine 10. Thus, the cooling system will pump coolant through the coolant passages 28, 50, 66, 128, 150, 166, and 352 as needed in order to assure that engine components do not overheat. Also, the fuel system 39 will store and provide fuel to the fuel injectors 34 and 134 at the desired pressure. The electrical system will provide electrical power to the controller 35, sensors and other components requiring electrical power to operate. The oil supply system will provide lubricating oil to the engine as needed for providing lubrication to certain components.

Figure 12:
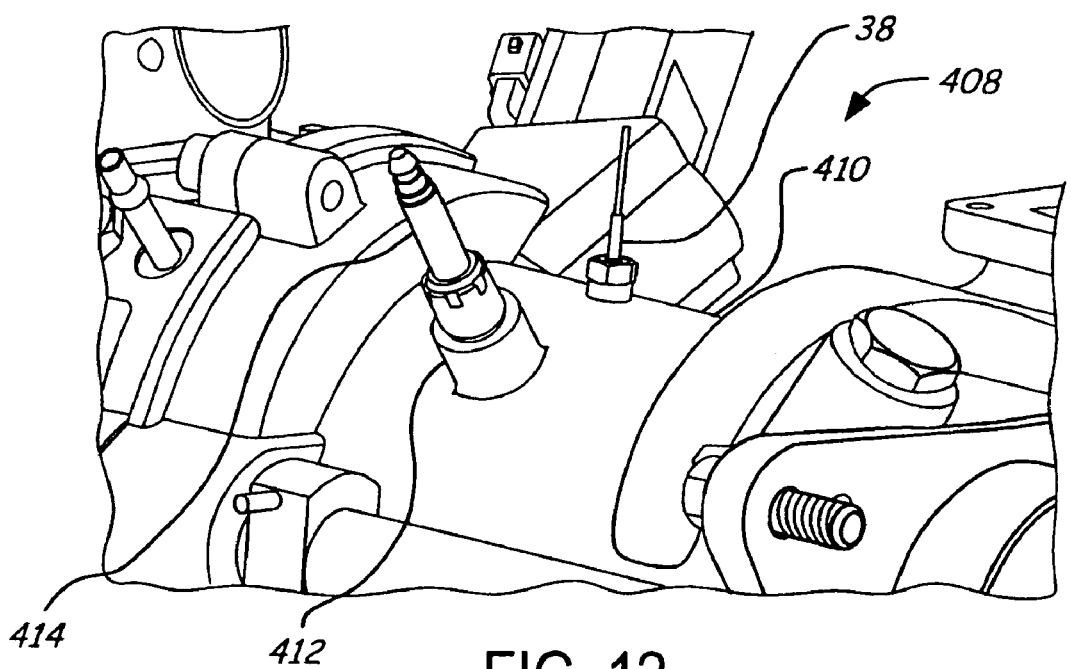
FIG. 12 is a perspective view of a portion of the engine of FIG. 1, but illustrating a second embodiment of the present invention.
Figure 13:
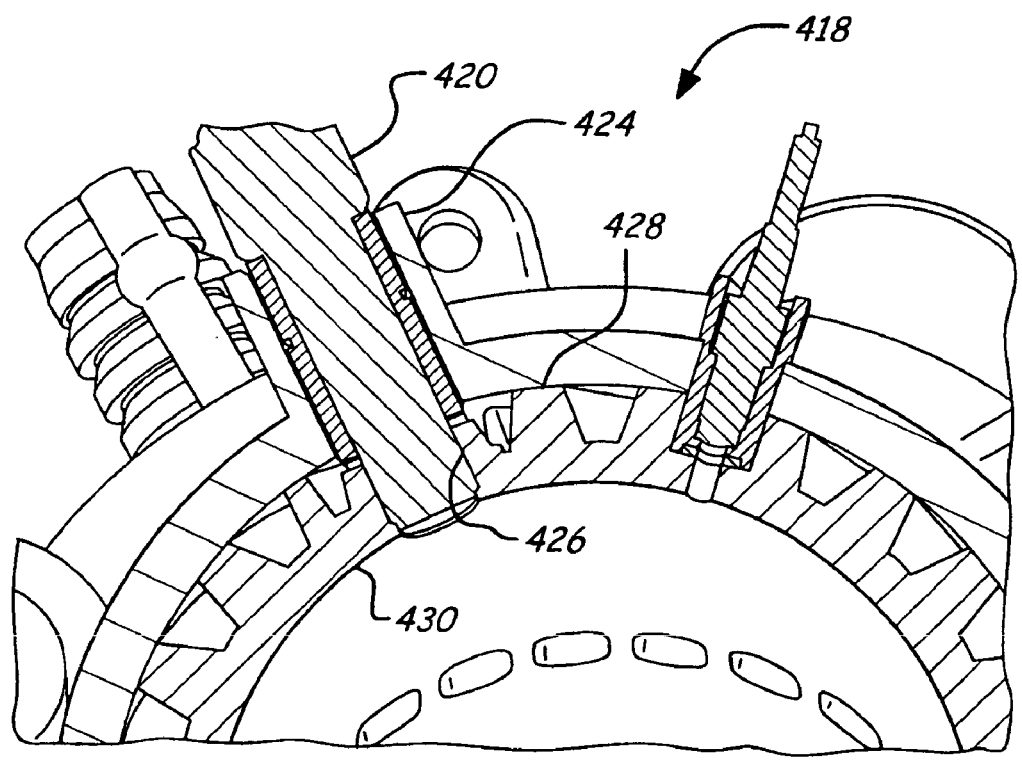
FIG. 13 is a sectional view of a portion of the engine of FIG. 1, but illustrating a third embodiment of the present invention.
Figure 14:
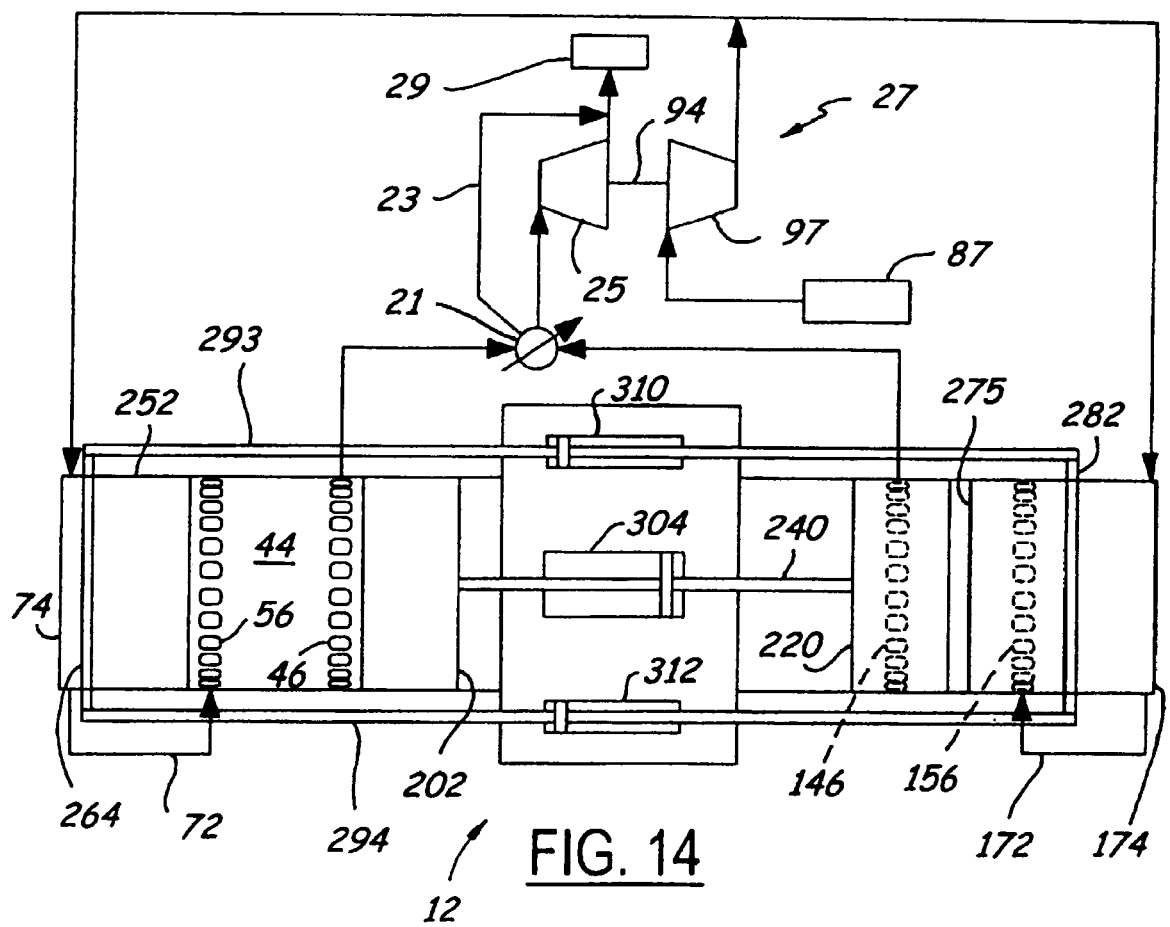
FIG. 14 is a schematic view of the air charging system of the engine of FIG. 1.

FIG. 12 illustrates an alternate embodiment of the present invention. In this embodiment, the engine 408 is essentially the same as in the first embodiment, except that the cylinder jacket 410 includes a spark plug mounting boss 412, within which a spark plug 414 is mounted. The cylinder liner (not shown in this figure) includes a channel aligned with the spark plug mounting boss 412, thus allowing the spark plug 414 to protrude into the cylinder. The spark plug 414 is preferably located about mid-cylinder between the pistons, and circumferentially spaced from the pressure sensor 38. The protruding end of the spark plug 414 connects to an electronic ignition system (not shown), which is preferably controlled by the controller 35 (not shown in this figure). Preferably, for this embodiment, both opposed cylinders include such a spark plug arrangement as just described.

The engine 408 operates in a similar manner to the engine of the first embodiment. While the addition of the spark plugs 414 adds somewhat to the cost and complexity of the engine, they allow for some added flexibility in starting and operating the engine 408. During engine start-up, if the compression ratios in the cylinders are not yet sufficient for HCCI combustion, then the spark plugs 414 can be activated at or near top dead center for each cylinder in order to cause combustion events to occur. This may be particularly true prior to normal engine operation, when the turbocharger is not yet operating at full capacity. Under this initial operating condition, the intake boost pressure may be less than desirable for operating a two-stroke HCCI combustion mode.

Then, during normal engine operation, the engine 408 may switch from spark ignition to operate with HCCI combustion. During this switch, the air/fuel ratio and compression ratio may be adjusted to account for the different mode of engine operation. Additionally, if, during normal HCCI engine operation, a combustion event did not occur, the spark can be employed to trigger a late combustion event in order to avoid a build-up of unburned fuel in the cylinder and avoid unburned fuel being pushed into the exhaust system. Or, if HCCI combustion is not desired for the operation of this engine, the engine 408 may be operated under normal operating conditions with spark ignition for all combustion events. In either case, the combined turbocharger and scavenge pump air charging system can provide the desired amount of intake air boost pressure.

Although the fluid employed for the energy storage medium and the control valve has been disclosed as hydraulic oil, other suitable fluids may also be employed if so desired. For example, the fluid may be a gas, with a pneumatic energy storage system for the reservoirs. The fluid may be a refrigerant that can be in the liquid or gaseous state. In both of these examples, since the fluid is no longer a liquid (being generally incompressible), the coupling system employed to assure the opposed motion of the two piston assemblies would also change. However, the OPOC free piston engine configuration, especially one employing HCCI combustion, can still be used to produce the energy stored in the fluid energy storage medium.

Moreover, while the exemplary embodiment of an OPOC free piston engine discussed in detail herein employs a hydraulic fluid as the energy storage and control medium, the turbocharger 27 and scavenge pumps 74 and 174 may be, of course, employed for supplying charged air to the cylinders of OPOC free piston engines that employ linear alternators for engine control and electrical energy production. The hydraulic pump block assembly would be replaced with a linear alternator assembly, with the pull and push rods forming a part of or driving linear alternator components. The piston/cylinder assemblies—including scavenge pumps—would operate to produce energy from combustion events to drive the linear alternators. So, HCCI combustion, with the desired high quantities of charge air, can still be employed with the OPOC free piston engine coupled to a linear alternator, as is preferred for maximizing the power density of the engine.

FIG. 15 shows a schematic of a fourth embodiment of the present invention. In this embodiment, the air charging system still includes a turbocharger 27, with a turbine 25, which is driven by the exhaust gas and connects to the exhaust system 29, and a compressor 97, which is driven by the turbine 25 and receives air from the air intake system 87. Again, the air emerging from the outlet of the compressor 97 is directed into the scavenge pumps 74 and 174. The scavenge pumps 74 and 174 pump the air out through the one-way valves 95 and 195, with the charged air entering the engine cylinders 44 and 144 while the intake ports are open. The details of the OPOC free piston engine 10 are not illustrated in FIG. 15 since they are essentially the same as in the first embodiment.

While most of the exhaust gas is still directed to the inlet of the turbine 25, as with the first embodiment, a portion is now diverted through external exhaust gas recirculation (EGR) assemblies. The first EGR assembly 502 includes a variable heat exchanger 504, which will cool the exhaust gas as it flows through, and a variable flow valve 506, which controls the amount of exhaust gas flow. The first EGR assembly 502 diverts the exhaust gas into intake air stream. Preferably, the first EGR assembly 502 inserts the exhaust gas between the turbocharger 27 and the scavenge pump 74 in order to avoid sending the EGR gas through rotary compressor. The second EGR assembly 508 includes a second variable heat exchanger 510 and a second variable flow valve 512, the same as the first EGR assembly 502, but feeding EGR gas into the second scavenge pump 174 instead. The control of the variable heat exchangers 504 and 510, as well as the variable flow valves 506 and 512, is preferably provided by the electronic controller 35 (not shown in this figure).

This fourth embodiment provides the ability to cool some of the EGR gas in the engine cylinders 44 and 144, as well as control the amount of EGR gas trapped in the cylinder during combustion events, which allows for more flexibility in managing the engine operating conditions. While the first embodiment has a generally fixed amount of trapped EGR without cooling of the trapped exhaust gasses, however, it does provide for a less complex and less costly EGR system. Additionally, the external EGR system of the fourth embodiment can be applied with the second and third embodiments of the present invention.

FIG. 16 illustrates a schematic of a fifth embodiment of the present invention. The details of each of the two OPOC free piston engines are not illustrated in FIG. 16 since they are basically the same, for each engine, as the first embodiment. This embodiment is similar to the fourth in that the turbocharger 27 includes the turbine 25, which is driven by exhaust gas that then flows into the exhaust system 29. The turbine 25 drives the compressor 97, which charges intake air received from the air intake system 87. This embodiment also employs the first EGR assembly 502 and the second EGR assembly 508 to cool and recirculate exhaust gas. However, this embodiment combines the exhaust and air intake systems for two free piston engines into one.

More specifically, the output from the compressor 97 is divided and routed to not only the first and second scavenge pumps 74 and 174, but also to a third scavenge pump 602 and a fourth scavenge pump 604. The first scavenge pump 74 directs the charge air into a first intercooler 606, which, while shown located upstream of the one-way outlet valve 95, may be located downstream of this valve. This intercooler 606 will cool the charged air prior to its entry into the first engine cylinder 44, thus improving the charge density in the cylinder. The first intercooler 606 may also be variable, in which case it is preferably controlled by the electronic controller 35 (not shown in this figure). The second scavenge pump 174 directs the charge air into a second intercooler 608, which will cool the charge air before it enters the second engine cylinder 144 via the one-way valve 195.

The third scavenge pump 602 directs the charge air into a third intercooler 610 and one-way valve 612 before being drawn into a third engine cylinder 614, which is part of the second free piston engine. The fourth scavenge pump 604 directs the charge air into a fourth intercooler 616 and one-way valve 618 before being drawn into a fourth engine cylinder 620, which is part of the second free piston engine.

The exhaust from the four engine cylinders 44, 144, 614, and 620 is directed back toward the input to the turbocharger turbine 25. As with the fourth embodiment, some of the exhaust gas can be diverted through the EGR assemblies 502 and 508 and fed back in to the intake air, if so desired. Also, the intercoolers 606 and 608 illustrated in this embodiment can be employed in the air charging system of the fourth embodiment, if so desired.

An advantage of the fifth embodiment relative to the fourth is that the number of components is reduced when operating with more than one free piston engine to produce the needed power output for the overall system. An advantage of the fourth embodiment relative to the fifth is that each free piston engine—when operating with multiple free piston engines—operates somewhat more independently, so when less power output is needed, one of the engines can be shut down with less effect on the operation of the others.

While certain embodiments of the present invention have been described in detail, those familiar with the art to which this invention relates will recognize various alternative designs and embodiments for practicing the invention as defined by the following claims.

What is claimed is:

1. A free piston engine comprising:
an energy storage and control assembly having a first side;
a first combustion cylinder assembly located adjacent to the first side of the energy storage and control assembly and including a first cylinder liner that defines a generally cylindrical first engine cylinder, which is centered about an axis of motion, with the first engine cylinder having a cylinder diameter, and with the first cylinder liner including an exhaust port and an intake port extending therethrough;
an outer piston assembly having a first outer piston located and telescopically slidable within the first engine cylinder along the axis of motion and having a first outer piston head facing the energy storage and control assembly, with the first outer piston including a first piston bridge located on an opposed end of the first outer piston from the first outer piston head, with the first piston bridge having an oval outer surface with a maximum diameter that is larger than the cylinder diameter of the first engine cylinder, and with the outer piston assembly including a first outer rod mounted to the first piston bridge and operatively engaging the energy storage and control assembly;
a first scavenge pump engaged with the first combustion cylinder and having a first scavenge pump housing, which defines an air inlet, an air outlet and includes a wall that defines a main pumping chamber selectively connectable to the air inlet and the air outlet, with the main pumping chamber telescopically receiving the first piston bridge therein and the wall being cylindrical in shape and having an oval cross section such that the oval outer surface of the first piston bridge seals against the wall; and
a turbocharger having a turbine in fluid communication with an inlet adapted for receiving exhaust gases from the exhaust port of the first combustion cylinder, and a compressor that is rotationally driven by the turbine and in fluid communication with an outlet that is in fluid communication with the air inlet of the first scavenge pump.

2. The free piston engine of claim 1 wherein:
the energy storage and control assembly further includes a second side in opposed relation to the first side;
the free piston engine further includes a second combustion cylinder assembly located adjacent to the second side of the energy storage and control assembly and has a second cylinder liner that defines a generally cylindrical second engine cylinder, which is centered about the axis of motion, with the second engine cylinder having a second cylinder diameter, and with the second cylinder liner including an exhaust port and an intake port extending therethrough;
the outer piston assembly includes a second outer piston located and telescopically slidable within the second engine cylinder along the axis of motion and having a second outer piston head facing the second side, and further includes a second piston bridge located on an opposed end of the second outer piston from the second outer piston head, with the second piston bridge having a generally oval outer surface with a maximum diameter that is larger than the second cylinder diameter and being connected to a second outer rod that operatively engages the energy storage and control assembly; and
a second scavenge pump engaged with the second combustion cylinder and having a second scavenge pump housing, which defines an air inlet, an air outlet and includes a wall that defines a second main pumping chamber selectively connectable to the air inlet and the air outlet, with the second main pumping chamber telescopically receiving the second piston bridge therein and the wall being cylindrical in shape and having an oval cross section such that the oval outer surface of the second piston bridge seals against the wall of the second main pumping chamber, and with the air inlet of the second scavenge pump in fluid communication with the outlet of the compressor.

3. The free piston engine of claim 2 wherein the first outer rod is mounted to the second piston bridge and the second outer rod is mounted to the first piston bridge.

4. The free piston engine of claim 3 further including an inner piston assembly having a first inner piston located and telescopically slidable within the first engine cylinder along the axis of motion and an inner rod mounted to the first inner piston and operatively engaging the energy storage and control assembly, and a second inner piston located and telescopically slidable within the second engine cylinder along the axis of motion and mounted to the inner rod.

5. The free piston engine of claim 4 wherein the energy storage and control assembly includes a fluid pumping assembly having an inner fluid pumping chamber and an outer fluid pumping chamber, a source of fluid under a relatively high pressure that is selectively in fluid communication with the inner fluid pumping chamber and the outer fluid pumping chamber, and a source of fluid under a relatively low pressure that is selectively in fluid communication with the inner fluid pumping chamber and the outer fluid pumping chamber, and with the inner rod extending and telescopically slidable through the inner fluid pumping chamber and the first outer rod extending and telescopically slidable through the outer fluid pumping chamber.

6. The free piston engine of claim 1 wherein the first outer piston defines a hollow cavity therein that is open to the first piston bridge, and the first piston bridge includes a web that defines an opening extending between the hollow cavity and the main pumping chamber.

7. The free piston engine of claim 6 wherein the first combustion cylinder assembly further includes a first air intake channel in fluid communication with the intake port; and the web of the first piston bridge includes a pair of closed portions, with each closed portion having a side facing away from the main pumping chamber that is in fluid communication with the first air intake channel.

8. The free piston engine of claim 1 wherein the outer piston assembly further includes a second outer rod mounted to the first piston bridge and operatively engaging the energy storage and control assembly.

9. The free piston engine of claim 1 further including an intercooler heat exchanger having an inlet in fluid communication with the air outlet of the first scavenge pump and an outlet in fluid communication with the intake port of the first combustion cylinder.

10. The free piston engine of claim 9 further including an external exhaust gas recirculation assembly having an inlet in fluid communication with the exhaust port of the first combustion cylinder and an outlet in fluid communication with the air inlet of the first scavenge pump.

11. The free piston engine of claim 1 further including a wastegate connected between the exhaust port and the inlet of the turbocharger, and a bypass tube, with the wastegate switchable for selectively diverting a portion of exhaust gasses flowing from the exhaust port through the bypass tube instead of to the inlet of the turbocharger.

12. A free piston engine comprising:
an energy generation and control assembly having a first side and a second side in opposed relation to the first side;
a first combustion cylinder assembly located adjacent to the first side of the energy generation and control assembly and including a first cylinder liner that defines a first engine cylinder, which is centered about an axis of motion, and with the first cylinder liner including a plurality of circumferentially spaced exhaust ports and a plurality of circumferentially spaced intake ports;
a second combustion cylinder assembly located adjacent to the second side of the energy generation and control assembly and including a second cylinder liner that defines a second engine cylinder, which is centered about the axis of motion, and with the second cylinder liner including a plurality of circumferentially spaced exhaust ports and a plurality of circumferentially spaced intake ports;
an inner piston assembly having a first inner piston with a first inner piston head and a second inner piston with a second inner piston head, with the first inner piston mounted in the first engine cylinder such that the first inner piston head faces away from the first side and is telescopically slidable within the first engine cylinder along the axis of motion, and with the second inner piston mounted in the second engine cylinder such that the second inner piston head faces away from the second side and is telescopically slidable within the second engine cylinder along the axis of motion, and with the inner piston assembly further including a push rod having a first end affixed to the first inner piston and a second end affixed to the second inner piston and a middle portion extending through the energy generation and control assembly;
an outer piston assembly having a first outer piston with a first outer piston head and a second outer piston with a second outer piston head, and with the first outer piston mounted in the first engine cylinder such that the first outer piston head faces toward the first inner piston head and is telescopically slidable within the first engine cylinder, and with the second outer piston mounted in the second engine cylinder such that the second outer piston head faces toward the second inner piston head and is telescopically slidable within the second engine cylinder, and with the outer piston assembly further including a first pull rod having a first end affixed to the first outer piston and a second end affixed to the second outer piston and a middle portion extending through the energy generation and control assembly; and
a turbocharger having a turbine including an inlet in fluid communication with the exhaust ports of the first combustion cylinder and the exhaust ports of the second combustion cylinder, and a compressor that is rotationally driven by the turbine and including an outlet that is in fluid communication with the intake ports of the first combustion cylinder and the exhaust ports of the second combustion cylinder.

13. The free piston engine of claim 12 wherein the plurality of exhaust ports in the first combustion cylinder are spaced from a bottom dead center position of the first inner piston about the same distance as the plurality of intake ports in the first combustion cylinder are spaced from a bottom dead center position of the first outer piston.

14. The free piston engine of claim 13 wherein the plurality of exhaust ports in the second combustion cylinder are spaced from the bottom dead center position of the second inner piston about the same distance as the plurality of intake ports in the first combustion cylinder are spaced from a bottom dead center position of the second outer piston.

15. The free piston engine of claim 12 further including a first scavenge pump having an air inlet that is in fluid communication with the outlet of the turbocharger compressor and an air outlet that is in fluid communication with the plurality of intake ports of the first combustion cylinder, and with the scavenge pump having a piston in a pumping chamber that is drivable by the first outer piston.

16. The free piston engine of claim 15 further including a second scavenge pump having an air inlet that is in fluid communication with the outlet of the turbocharger compressor and an air outlet that is in fluid communication with the plurality of intake ports of the second combustion cylinder, and with the scavenge pump having a piston in a pumping chamber that is drivable by the second outer piston.

17. The free piston engine of claim 15 further including an intercooler heat exchanger having an inlet in fluid communication with the air outlet of the first scavenge pump and an outlet in fluid communication with the plurality of intake ports of the first combustion cylinder.

18. A free piston engine assembly comprising:
a first free piston engine including an energy generation and control assembly having a first side and a second side in opposed relation to the first side; a first combustion cylinder assembly located adjacent to the first side of the energy generation and control assembly and including a first cylinder liner that defines a first engine cylinder, and with the first cylinder liner including an exhaust port and an intake port; a second combustion cylinder assembly located adjacent to the second side of the energy generation and control assembly and including a second cylinder liner that defines a second engine cylinder, and with the second cylinder liner including an exhaust port and an intake port; and a first piston assembly having a first piston located and telescopically slidable within the first engine cylinder, a second piston located and telescopically slidable within the second engine cylinder, and a driven rod affixed between the first and second pistons and having a middle portion extending through and engaging the energy generation and control assembly;

a second free piston engine including a second energy generation and control assembly having a first side and a second side in opposed relation to the first side; a third combustion cylinder assembly located adjacent to the first side of the second energy generation and control assembly and including a third cylinder liner that defines a third engine cylinder, and with the third cylinder liner including an exhaust port and an intake port, a fourth combustion cylinder assembly located adjacent to the second side of the second energy generation and control assembly and including a fourth cylinder liner including an exhaust port and an intake port, and a second piston assembly having a third piston located and telescopically slidable within the third engine cylinder, and a fourth piston located and telescopically slidable within the fourth engine cylinder, and a second driven rod affixed between the third and fourth pistons and having a middle portion extending through and engaging the second energy generation and control assembly; and a turbocharger having a turbine including an inlet adapted to be in fluid communication with exhaust from the exhaust ports of the first, second, third and fourth combustion cylinders, and having a compressor that is rotationally driven by the turbine and includes an outlet that is in adapted to be in fluid communication with the intake ports of the first, second, third and fourth combustion cylinders.

19. The free piston engine assembly of claim 18 further including a first scavenge pump having an air inlet that is in fluid communication with the outlet of the turbocharger compressor and an air outlet that is in fluid communication with the intake port of the first combustion cylinder.

20. The free piston engine assembly of claim 19 further including a second scavenge pump having an air inlet that is in fluid communication with the outlet of the turbocharger compressor and an air outlet that is in fluid communication with the intake port of the second combustion cylinder.

* * * * *